(12) United States Patent
Boysen et al.

(10) Patent No.: US 8,863,308 B2
(45) Date of Patent: Oct. 14, 2014

(54) SYSTEM AND METHODS FOR PROVIDING IDENTITY ATTRIBUTE VALIDATION IN ACCORDANCE WITH AN ATTRIBUTE DISCLOSURE PROFILE

(75) Inventors: Andre Michel Boysen, Huntsville (CA); Gregory Wolfond, Toronto (CA); Pierre Antoine Roberge, Toronto (CA); Patrick Hans Engel, Richmond Hill (CA); Troy Jacob Ronda, Toronto (CA)

(73) Assignee: SecureKey Technologies Inc., Toronto, Ontario (CA)

(*) Notice: Subject to any disclaimer, the term of this patent is extended or adjusted under 35 U.S.C. 154(b) by 0 days.

(21) Appl. No.: 13/513,487

(22) PCT Filed: Dec. 1, 2010

(86) PCT No.: PCT/CA2010/001927
§ 371 (c)(1),
(2), (4) Date: Jun. 1, 2012

(87) PCT Pub. No.: WO2011/066658
PCT Pub. Date: Jun. 9, 2011

(65) Prior Publication Data
US 2012/0233705 A1  Sep. 13, 2012

Related U.S. Application Data

(60) Provisional application No. 61/265,379, filed on Dec. 1, 2009.

(51) Int. Cl.
*H04L 29/06* (2006.01)
*G06F 21/33* (2013.01)
*G06F 21/62* (2013.01)
*G06F 21/42* (2013.01)
*H04L 9/32* (2006.01)
*G06F 21/77* (2013.01)
*G06F 21/73* (2013.01)
*H04L 9/06* (2006.01)
*G06F 21/34* (2013.01)

(52) U.S. Cl.
CPC ............ *H04L 9/3213* (2013.01); *G06F 21/335* (2013.01); *G06F 21/6245* (2013.01); *G06F 21/6272* (2013.01); *G06F 21/42* (2013.01); *G06F 2221/2115* (2013.01); *H04L 9/3263* (2013.01); *G06F 21/77* (2013.01); *H04L 63/0823* (2013.01); *G06F 21/73* (2013.01); *H04L 9/0662* (2013.01); *H04L 63/0492* (2013.01); *G06F 21/34* (2013.01); *H04L 9/3234* (2013.01); *G06F 2221/2129* (2013.01)
USPC ............................................ 726/29; 713/169

(58) Field of Classification Search
CPC . H04L 63/10; H04L 63/0823; H04L 63/0492; H04L 9/321
USPC ............................................................ 726/29
See application file for complete search history.

(56) References Cited

U.S. PATENT DOCUMENTS 6,249,873 B1 * 6/2001 Richard et al. .................... 726/4
7,254,561 B1 * 8/2007 Sjoblom .......................... 705/65

(Continued)

OTHER PUBLICATIONS

Document relating to AU Application No. 2010327295, dated Feb. 25, 2014 (Office Action).

*Primary Examiner* — Hadi Armouche
*Assistant Examiner* — Bryan Wright
(74) *Attorney, Agent, or Firm* — Bereskin & Parr LLP/S.E.N.C.R.L., s.r.l.

(57) ABSTRACT

A method of identity attribute validation at a computer server involves the computer server receiving an identity attribute validation request from a communication terminal. The computer server further receives a credential, and is configured with an attribute disclosure profile of attributes authorized for disclosure to the communication terminal. The computer server determines the validity of the credential, and provides the communication terminal with a response to the identity attribute validation request based on an outcome of the credential validity determination. The attribute validation response includes attributes data associated with the credential authorized for disclosure by the attribute disclosure profile but excludes attributes data associated with the credential not authorized for disclosure by the attribute disclosure profile.

14 Claims, 14 Drawing Sheets

(56) References Cited

U.S. PATENT DOCUMENTS

| | | | |
|---|---|---|---|
| 7,353,383 B2* | 4/2008 | Skingle | 713/156 |
| 2002/0078150 A1* | 6/2002 | Thompson et al. | 709/204 |
| 2004/0260699 A1* | 12/2004 | Aoki et al. | 707/9 |
| 2006/0053296 A1* | 3/2006 | Busboom et al. | 713/182 |
| 2009/0007259 A1* | 1/2009 | Argott | 726/21 |
| 2009/0028082 A1* | 1/2009 | Wynn et al. | 370/310 |
| 2010/0185864 A1* | 7/2010 | Gerdes et al. | 713/175 |
| 2011/0265159 A1* | 10/2011 | Ronda et al. | 726/6 |
| 2011/0302646 A1* | 12/2011 | Ronda et al. | 726/9 |
| 2011/0307949 A1* | 12/2011 | Ronda et al. | 726/9 |
| 2012/0072718 A1* | 3/2012 | Ronda et al. | 713/156 |

* cited by examiner

SYSTEM AND METHODS FOR PROVIDING IDENTITY ATTRIBUTE VALIDATION IN ACCORDANCE WITH AN ATTRIBUTE DISCLOSURE PROFILE

RELATED APPLICATIONS

This patent application claims the benefit of the filing date of U.S. patent application No. 61/265,379 filed Dec. 1, 2009, entitled "MEDIATED DISCLOSURE TERMINAL", the entire contents of which is incorporated herein by reference.

FIELD

This patent application relates generally to techniques for identity validation. In particular, this patent application describes a method and apparatus for identity attribute validation and disclosure.

BACKGROUND

A hardware token, such as a credit/payment card, driver's license or passport, is commonly used by its bearer to prove identity and/or a personal attribute, such as age, residence address or citizenship. Due to the practical limitations of hardware tokens, all of the information that is stored or shown on the token is available to the recipient, even though the recipient might only have a legitimate need for only a subset of that information.

For example, a liquor store customer might present a driver's licence to provide proof of the customer's age. The photograph and date of birth information printed on the driver's license provides proof of age, but might also disclose other identity attributes data, such as residence address, height and corrective lens requirements, which the recipient does not need to complete the transaction. Given the growing concerns over identity theft, this model for proving identity attributes is inconsistent with the need to prevent the unauthorized use and disclosure of personal information.

SUMMARY

By way of overview, this patent application describes a server-based and a terminal-based method and apparatus for the controlled disclosure of attribute data associated with a credential.

In a first aspect of the disclosure, there is provided a method of identity attribute validation that involves a computer server receiving an identity attribute validation request originating from a communication device. The computer server also receives a credential and is configured with an attribute disclosure profile of attributes authorized for disclosure to the communication device.

The computer server determines the validity of the credential, and provides the communication device with a response to the identity attribute validation request based on an outcome of the credential validity determination. The attribute validation response includes attribute data associated with the credential authorized for disclosure by the attribute disclosure profile but excludes attribute data associated with the credential not authorized for disclosure by the attribute disclosure profile.

In accordance with the first aspect of this disclosure, there is also provided a credential issuer server that includes an attribute disclosure profile, and an identity attribute validation request processor. The attribute disclosure profile identifies attributes authorized for disclosure to a communication device.

The identity attribute validation request processor is configured to receive an identity attribute validation request originating from the communication device. The identity attribute validation request processor is also configured to determine the validity of a credential that is received at the credential issuer server, and to provide the communication device with a response to the identity attribute validation request based on an outcome of the credential validity determination. The attribute validation response includes attribute data associated with the credential authorized for disclosure by the attribute disclosure profile but excludes attribute data associated with the credential not authorized by the attribute disclosure profile.

In accordance with the first aspect of this disclosure, there is also provided a computer-readable medium having an attribute disclosure profile, and computer program instructions stored thereon. The attribute disclosure profile identifies attributes authorized for disclosure to a communication device.

The computer program instructions, when executed by a computer, cause the computer to (1) receive an identity attribute validation request originating from the communication device, (2) determine a validity of a credential received at the computer, and (3) provide the communication device with a response to the identity attribute validation request based on an outcome of the credential validity determination. The attribute validation response includes attribute data associated with the credential authorized for disclosure by the attribute disclosure profile but excludes attribute data not authorized for disclosure by the attribute disclosure profile.

In one implementation of the first aspect of the disclosure, the computer server receives the credential over a communication channel that is distinct from the communication channel over which the computer server receives the identity attribute validation request. Preferably, the credential is associated with a hardware token. The computer server may transmit a session token to the hardware token, and may determine the validity of the credential by verifying that the hardware token generated the credential from the session token.

The hardware token may be configured with a private encryption key, and the computer server may be configured with a public encryption key corresponding to the private encryption key. The computer server may verify the credential by validating the credential with the public encryption key. The computer server may also validate the credential by verifying that the credential is still in force.

In a second aspect of this disclosure, there is provided a method of identity attribute validation that involves a communication terminal receiving a credential from a hardware token interfaced with the communication terminal, transmitting the credential and an identity attribute validation request to a computer server, and receiving a response to the identity attribute validation request from the computer server. The attribute validation response is based on an outcome of a determination of validity of the credential by the computer server. In accordance with the attribute validation response, the communication terminal receives interrogates the hardware token for attribute data associated with the credential authorized for disclosure to the communication terminal but excluding attribute data associated with the credential not authorized for disclosure to the communication terminal. The communication terminal then generates an authorization signal in accordance with a correlation between the authorized attribute data and a predetermined criterion.

In accordance with the second aspect of this disclosure, there is also provided a validation terminal that includes a credential interface, and an identity attribute validation processor. The credential interface is configured to interface with a hardware token.

The identity attribute validation processor is configured to (1) receive a credential from the hardware token, (2) transmit the credential and an identity attribute validation request to a computer server, (3) receive a response to the identity attribute validation request from the computer server, (4) in accordance with the attribute validation response, interrogate the hardware token for attribute data associated with the credential authorized for disclosure to the communication terminal but excluding attribute data associated with the credential not authorized for disclosure to the communication terminal, and (5) generate an authorization signal in accordance with a correlation between the authorized attribute data and a predetermined criterion.

The attribute validation response is based on an outcome of a determination of validity of the credential by the computer server.

In accordance with the second aspect of this disclosure, there is also provided a computer-readable medium having computer program instructions stored thereon. The computer program instructions, when executed by a computer, cause the computer to (1) receive a credential from a hardware token interfaced with the computer, (2) transmit the credential and an identity attribute validation request to a computer server, (3) receive a response to the identity attribute validation request from the computer server, (4) in accordance with the attribute validation response, interrogate the hardware token for attribute data associated with the credential authorized for disclosure to the computer but excluding attribute data associated with the credential not authorized for disclosure to the computer; and (5) generate an authorization signal in accordance with a correlation between the authorized attribute data and a predetermined criterion.

The attribute validation response is based on an outcome of a determination of validity of the credential by the computer server.

In one implementation of the second aspect of the disclosure, the validation terminal is configured with an attribute disclosure profile of attributes authorized for disclosure to the validation terminal. The validation terminal is configured to interrogate the hardware token for the authorized attribute data by querying the hardware token only for the attribute data authorized by the attribute disclosure profile.

The attribute validation response may include further attribute data authorized for disclosure to the validation terminal but excluding the attribute data not authorized for disclosure to the validation terminal.

BRIEF DESCRIPTION OF THE DRAWINGS

The foregoing aspects will now be described, by way of example, with reference to the accompanying drawings, in which.

DETAILED DESCRIPTION

Identity Attribute Validation System (Embodiment #1)

Figure 1:
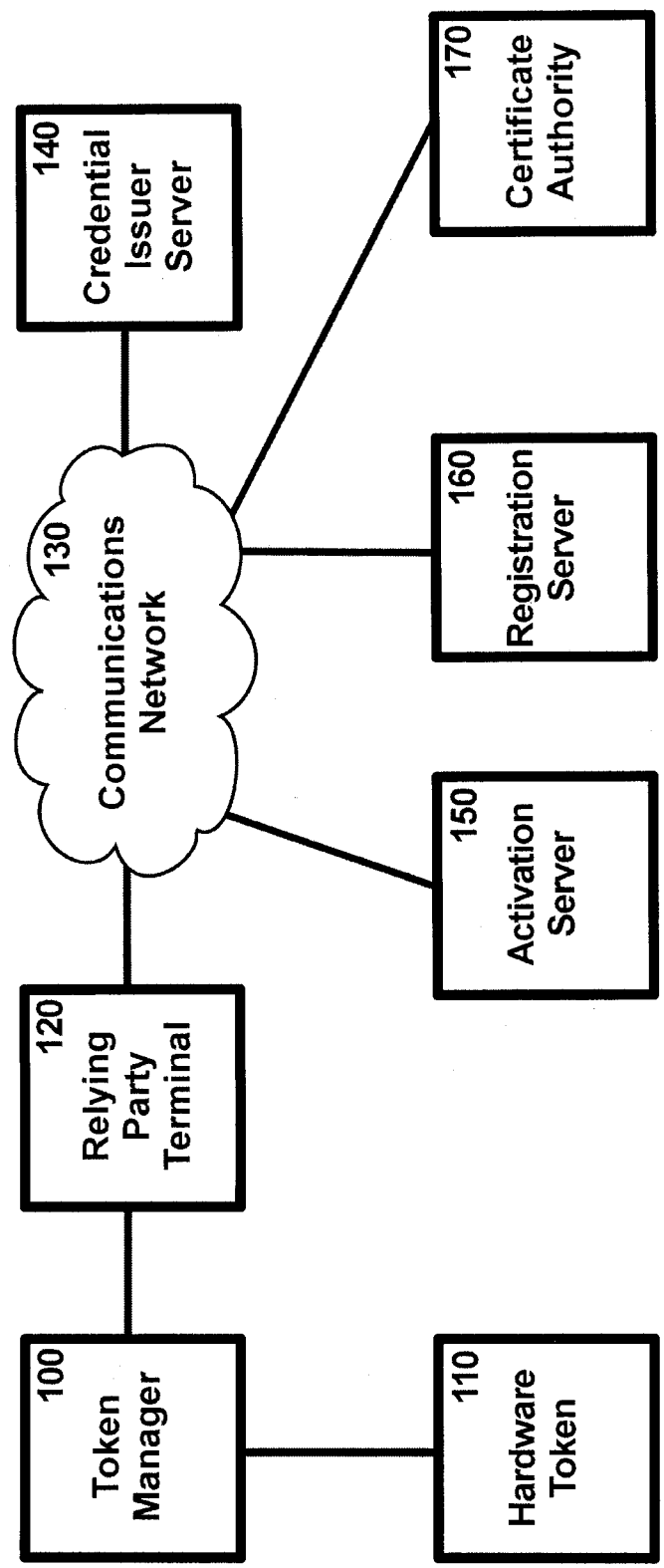
FIG. 1 is a block diagram illustrating a first embodiment of an identity attribute validation system.

Turning to FIG. 1, there is shown a first embodiment of an identity attribute validation system, comprising a Token Manager 100, a Hardware Token 110, a Relying Party Terminal 120, one or more Credential Issuer Servers 140, an Activation Server 150, a Registration Server 160 and a Certificate Authority 170. Although the Relying Party Terminal 120, Credential Issuer Server 140, Activation Server 150, Registration Server 160 and Certificate Authority 170 are shown being interconnected by a single communications network 130, the communications network 130 may comprise one or more different networks.

An enterprise (Relying Party) that requires access to the identity attribute validation system is provided with one or more Token Managers 100. Each Token Manager 100 may be implemented as a portable USB device or in a Point of Sale (POS) terminal, and may interface with the Relying Party Terminal 120. The Token Manager 100 may be embedded in As will be discussed below, the Token Manager 100 facilitates the establishment of a communications channel between the Hardware Token 110 and the Credential Issuer Server 140 over the communications network 130 via the Relying Party Terminal 120. In this first embodiment of the identity attribute validation system, the Token Manager 100 and the Relying Party Terminal 120 are located in the premises of the Relying Party, and the Token Manager 100 is interfaced with the Relying Party Terminal. The bearer of the Hardware Token 110 engages the identity attribute validation system by attending at the premises of the Relying Party and interfacing the Hardware Token 110 with the Token Manager 100.

The Hardware Token 110 may be a form of portable authenticator, and may be implemented as a contactless form factor, a contact form factor, or other NFC and/or ISO 14443 based form factors. Suitable implementations of the Hardware Token 110 include, but are not limited to, a smartcard, a payment card, a credit card, a loyalty card, a building access pass, a driver's license, a health card, and a passport. The Hardware Token 100 may also be embedded in a communications device, including a POS terminal, personal computer, data messaging device, two-way pager, wireless e-mail device, wireless telephone, and a wireless Internet appliance.

The Hardware Token 110 typically includes a secure data processor that is implemented using smart card technology and comprises a micro-processor (sometimes called a micro-controller or crypto-processor) and protected memory. The secure data processor provides a protected self-contained computing environment used for running cryptographic and proprietary algorithms that are stored within the secure data processor. The protected memory stores sensitive information required for implementation of the cryptographic and proprietary algorithms, including the unique identifier (CFFID) of the Hardware Token 110, a Trusted Hardware private encryption key THPrivK and a Trusted Hardware Public Certificate THPubC. THPubC includes a Trusted Hardware public encryption key THPubK corresponding to DPrivK. THPrivK and THPubK comprise an asymmetric encryption key pair. Both THPrivK and THPubC are installed on the Hardware Token 110 by the Credential Issuer before the Hardware Token 110 is shipped to the intended recipient.

Figure 2:
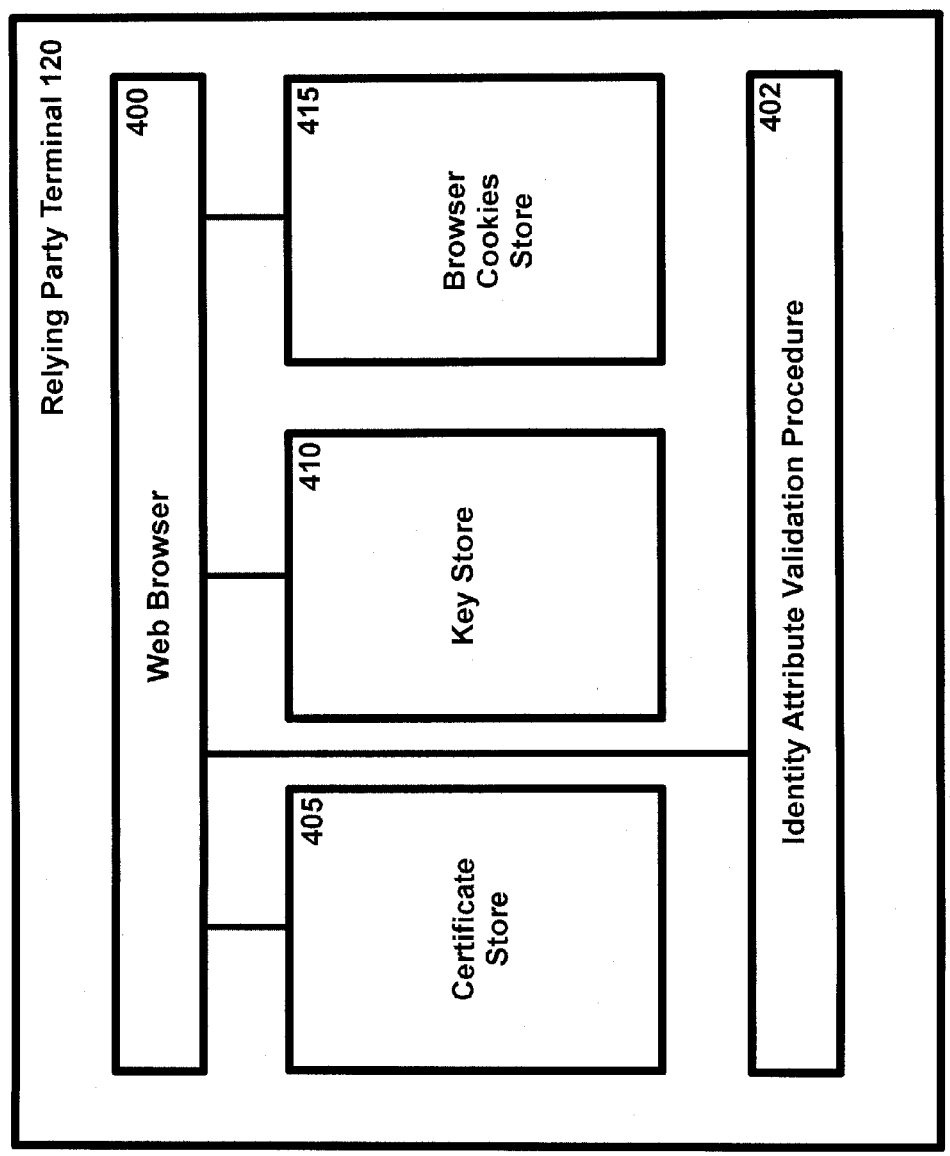
FIG. 2 is a schematic view of the Relying Party Terminal of the identity attribute validation system depicted in FIG. 1.

The Relying Party Terminal 120 comprises a networked computing device that is maintained by the Relying Party. The Relying Party Terminal 120 may be implemented as a personal computer, a POS terminal, a data messaging device, a two-way pager, a wireless e-mail device, a wireless telephone, a wireless Internet appliance, as examples. As shown in FIG. 2, the Relying Party Terminal 120 comprises a web browser 400 (or other communication application), an Identity Attribute Validation procedure 402, a Certificate Store 405, a Key Store 410, and a browser cookies store 415. The browser 400 interfaces with the Certificate Store 405, the Key Store 410 and browser cookies store 415, and is used to facilitate communication with the Credential Issuer Server 140, the Activation Server 150 and the Registration Server 160 over the communications network 130.

As will be discussed below, during the Authentication process implemented by the Token Manager 100, the Relying Party Terminal 120 receives a credential from a Hardware Token 110 that is interfaced with the Relying Party Terminal 120. The Identity Attribute Validation procedure 402 transmits the credential and an identity attribute validation request to Credential Issuer Server 140, receives a response to the identity attribute validation request from the Credential Issuer Server 140, and generates an authorization signal in accordance with the attribute validation response. The attribute validation response is based on an outcome of a determination of validity of the credential by the Credential Issuer Server 140.

The attribute validation response may include attribute data associated with the credential authorized for disclosure to the Relying Party Terminal 120 but excluding attribute data associated with the credential not authorized for disclosure to the Relying Party Terminal 120.

In one variation, in accordance with the attribute validation response, the Relying Party Terminal 120 may interrogate the hardware token for attribute data associated with the credential authorized for disclosure to the Relying Party Terminal 120 but excluding attribute data associated with the credential not authorized for disclosure to the Relying Party Terminal 120. The Relying Party Terminal 120 may maintain an attribute disclosure profile (not shown) of attributes authorized for disclosure to the Relying Party Terminal 120, and the Relying Party Terminal 120 may interrogate the hardware token for the authorized attribute data by querying the hardware token only for the attribute data authorized by the attribute disclosure profile. The attribute validation response may include additional attribute data authorized for disclosure to the Relying Party Terminal 120 but excluding the attribute data not authorized for disclosure to the Relying Party Terminal 120.

Figure 3A:
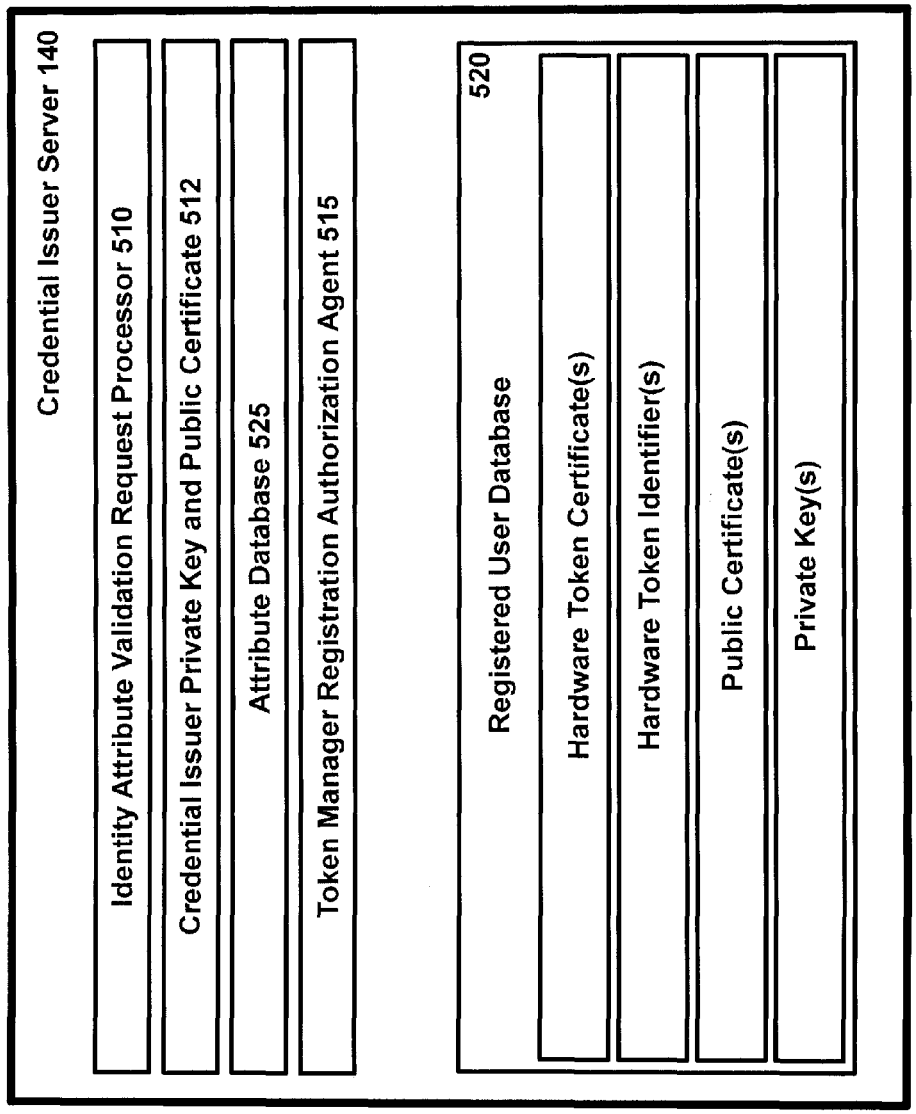
FIG. 3a is a schematic view of the Credential Issuer Server of the identity attribute validation system.

Preferably, the Credential Issuer Server 140, the Activation Server 150, and the Registration Server 160 are implemented as computer web servers, and communicate with the Certificate Authority 170 via a secure protocol over the communications network 130. As shown in FIG. 3a, the Credential Issuer Server 140 includes an Identity Attribute Validation Request Processor 510, a Credential Issuer Private encryption key CIPrivK and Credential Issuer Public Certificate CIPubC 512, a Token Manager Registration Authorization Agent 515, a Random Number Generator application 516, a Registered User Database 520, and an Attribute Database 525. CIPubC includes a Credential Issuer public encryption key CIPubK corresponding to CIPrivK. CIPrivK and CIPubK comprise an asymmetric encryption key pair.

The Registered User Database 520 includes records of Hardware Token Certificates (THPubC) and the associated Hardware Token Unique Identifiers (CFFIDs). The Registered User Database 520 also includes records of the Public Certificates (UPubC) of the Token Managers 100 that have been registered during the Registration process, and the associated Token Manager Serial Numbers 321. The Attribute Database 525 includes attributes data associated with each Hardware Token 110, and an attribute disclosure profile for each Relying Party identifying the scope (attributes) of the attribute data authorized for disclosure to the associated Relying Party. Preferably, the attribute data is associated with the respective Hardware Token 110 by the CFFID of the Hardware Token 110. Further, preferably the Relying Party is identified in the attribute disclosure profile by the Relying Party's UserID and the Public Certificate (UPubC) that was assigned to the Relying Party during the Token Manager Activation process.

The attributes data may include absolute attribute data associated with the recipient of the Hardware Token 110, such as (but not limited to) the age, physical characteristics, and/or personal characteristics or information of the recipient. The scope of attributes data authorized by the attribute disclosure profile may include all or a subset of the attributes data of the recipient of the Hardware Token 110. Alternately, or additionally, the scope of attributes data authorized by the attribute disclosure profile may include relative attributes data (i.e. attributes data expressed relative to a requirement of the Relying Party), such as an indication of whether the recipient of the Hardware Token 110 satisfies a minimum age requirement specified by the Relying Party, is a resident of a particular province or state, is eligible for public healthcare or is a registered voter.

As will be discussed below, during the Authentication process implemented by the Token Manager 100, the Credential Issuer Server 140 receives an identity attribute validation request from the Relying Party Terminal 120. The Identity Attribute Validation Request Processor 510 is configured to determine the validity of a credential, and to provide the Relying Party Terminal 120 with a response to the identity attribute validation request based on an outcome of the credential validity determination.

Typically, the credential is generated by the Hardware Token 110 from an artefact that is transmitted to the Hardware Token 110 from the Credential Issuer Server 140, and the Identity Attribute Validation Request Processor 512 validates the credential by verifying that the credential was generated by the Hardware Token 110 from the artefact. The attribute validation response may include attribute data associated with the Hardware Token 110 and authorized for disclosure to the Relying Party by the Relying Party's attribute disclosure profile, but excluding the attribute data not authorized for disclosure to the Relying Party by the Relying Party's attribute disclosure profile. Alternately, the attribute validation response may indicate whether the credential was validated.

Figure 3B:
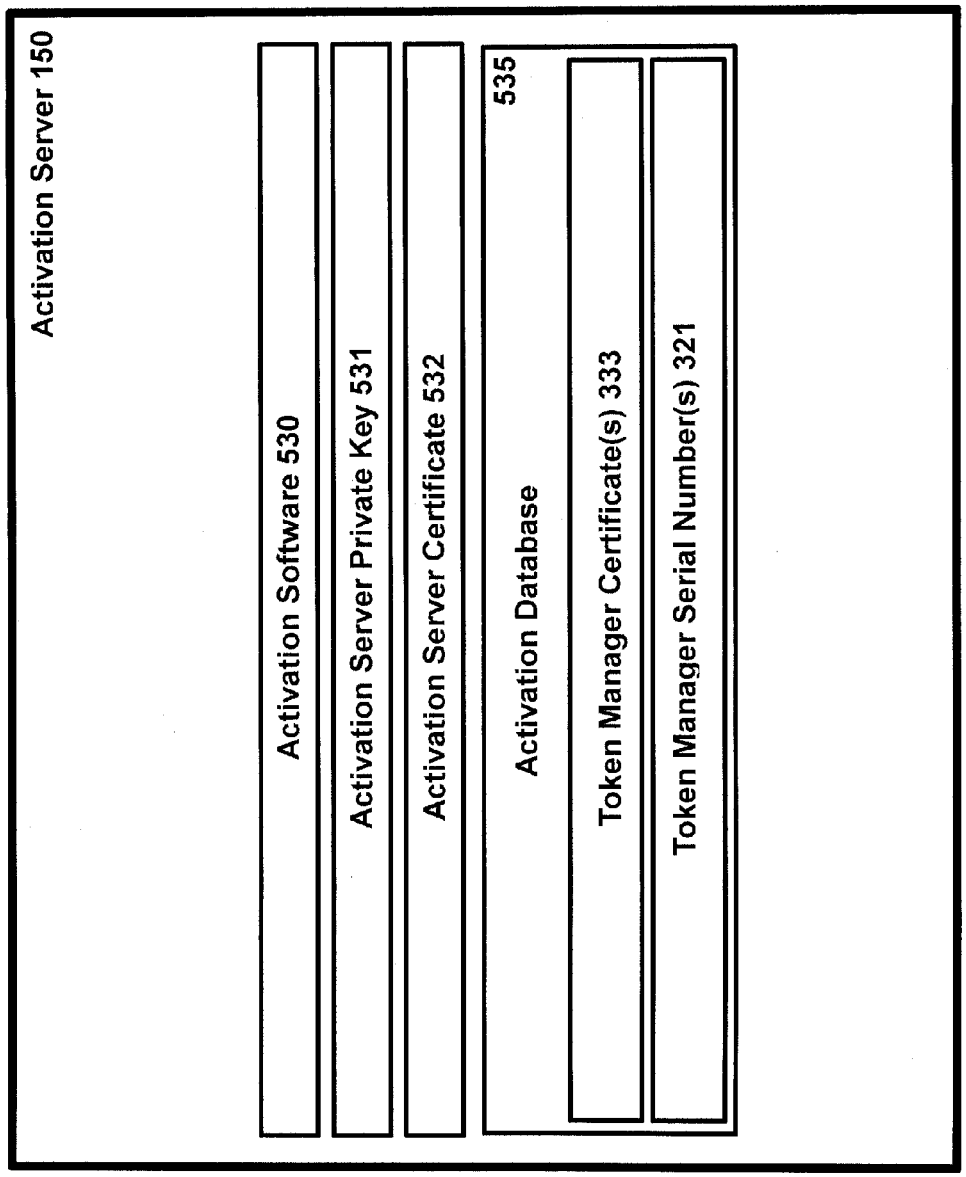
FIG. 3b is a schematic view of the Activation Server of the identity attribute validation system.

As shown in FIG. 3b, the Activation Server 150 includes Activation Software 530, an Activation Server Private Key Store 531, an Activation Server Certificate Store 532, and an Activation Database 535. The Activation Database 535 includes records of Token Manager Certificates (DPubC) 333 and Token Manager Serial Numbers 321. The Activation Server 150 uses the Activation Software 530 to implement the Token Manager Activation process (described below).

Figure 3C:
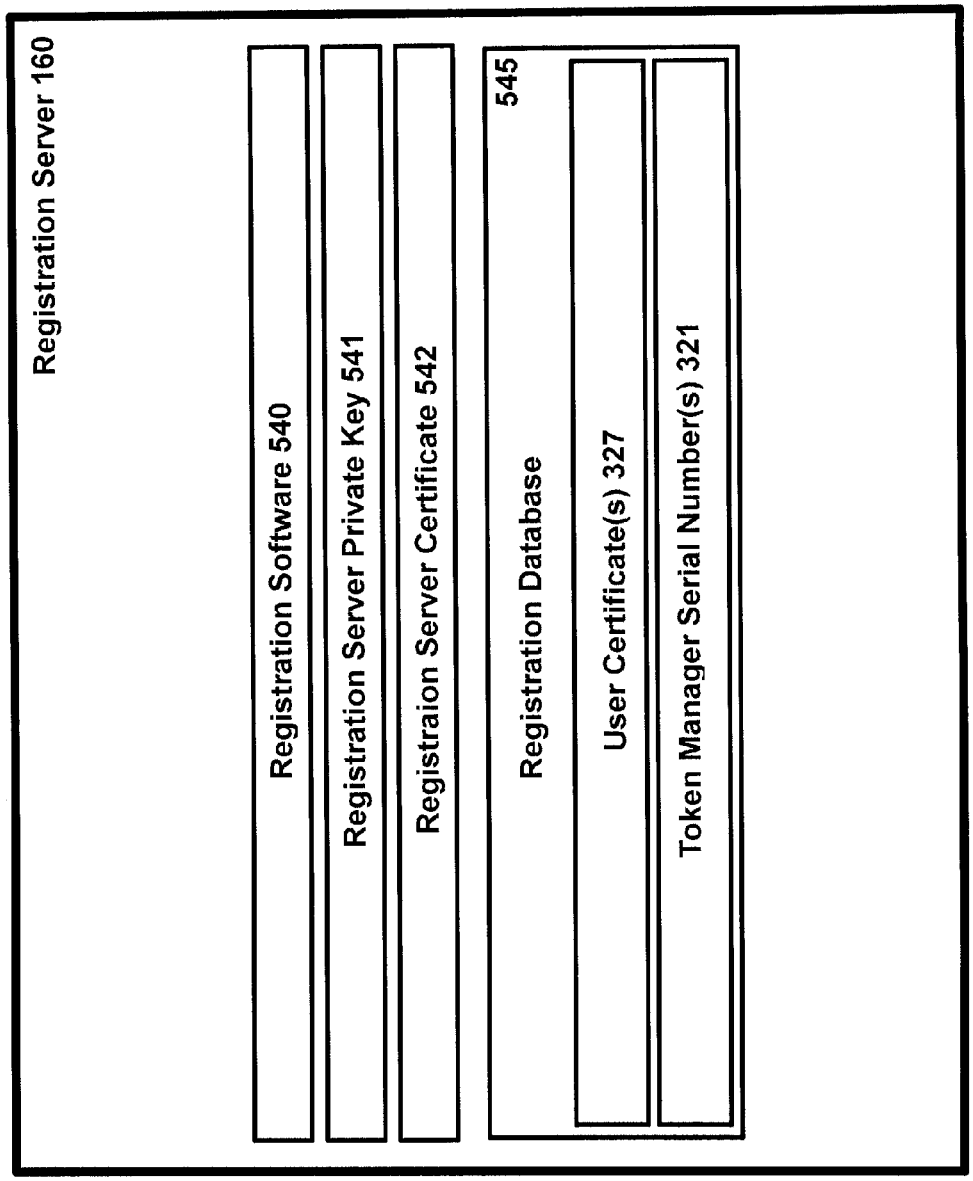
FIG. 3c is a schematic view of the Registration Server of the identity attribute validation system.

As shown in FIG. 3c, the Registration Server 160 includes Registration Software 540, a Registration Server Private Key Store 541, a Registration Server Certificate Store 542, and a Registration Database 545. The Registration Database 545 includes records of Public Certificates (UPubC) assigned to Token Managers 100 during Activation, and Token Manager Serial Numbers. The Registration Server 160 uses the Registration Software 540 to implement the Token Manager Registration process (described below).

Token Manager 100

The Token Manager 100 may communicate with the Hardware Token 110 over a contactless protocol, such as ISO 14443. Alternately, the Token Manager 100 may communicate with the Hardware Token 110 without a wireless link. Although the Hardware Token 110 is shown in FIG. 1 in direct communication with the Token Manager 100, the Hardware Token 110 and the Token Manager 100 need not be implemented as separate devices; rather, the functionality of the Hardware Token 110 may be embedded within the Token Manager 100 such that the Hardware Token 110 and the Token Manager 100 comprise a single device.

Figure 4:
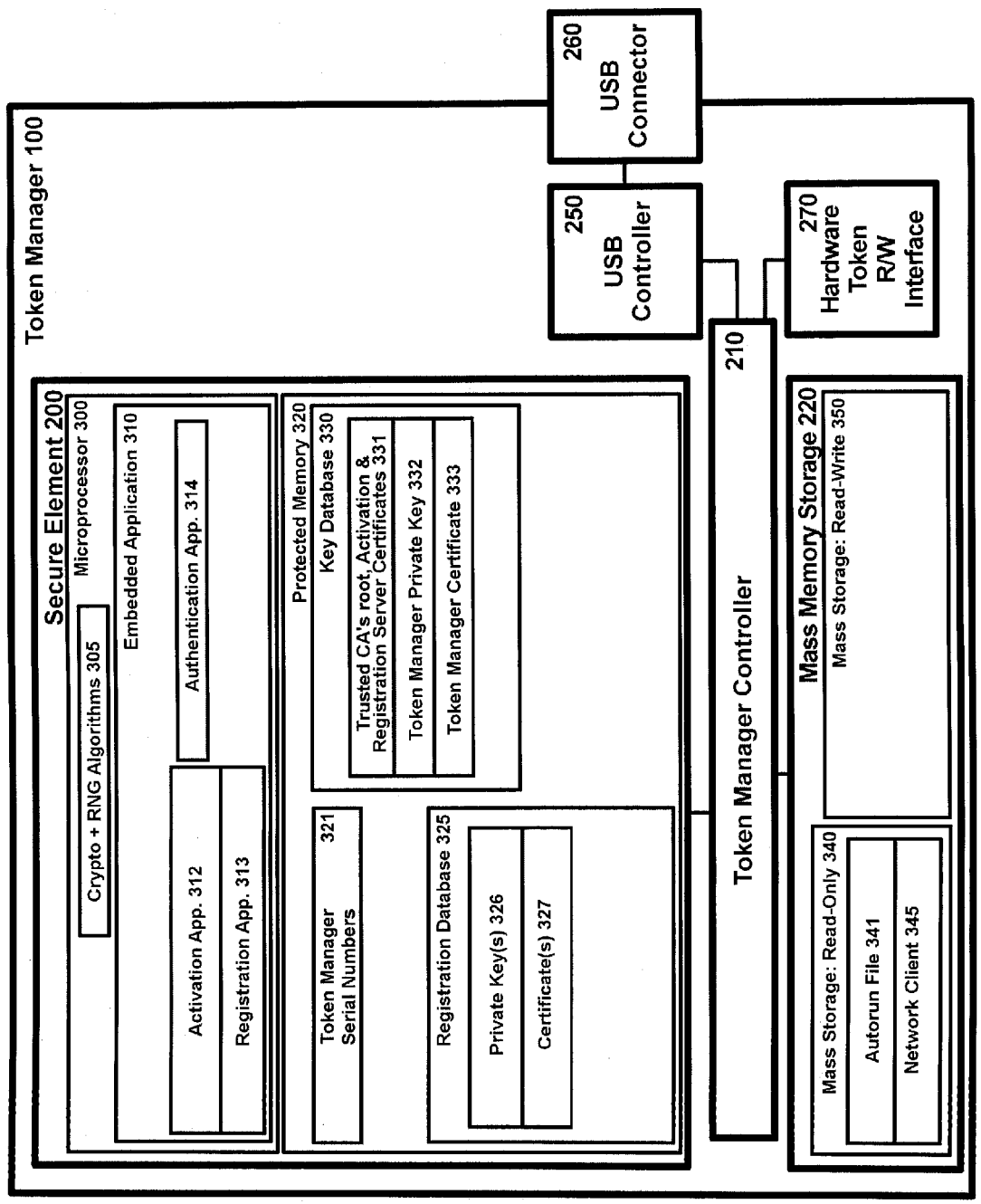
FIG. 4 is a detailed schematic view of the Token Manager of the identity attribute validation system.

As shown in FIG. 4, the Token Manager 100 may physically interface with the Relying Party Terminal 120 using the USB Connector 260. The USB connector 260 and USB controller 250 provide USB connectivity between the Token Manager 100 and the Relying Party Terminal 120. Alternately, the Token Manager 100 may be embedded within the Relying Party Terminal 120. The Token Manager 100 may have a contactless or contact token reader/writer interface 270 that allows the Token Manager 100 to communicate with the Hardware Token 110.

The Token Manager 100 typically includes a Secure Element 200, a Token Manager Controller 210, and a mass memory storage 220. Preferably, the Secure Element 200 is implemented using smart card technology with a built-in micro-processor (sometimes called a micro-controller or crypto-processor) and protected memory for secure storage. The Secure Element 200 provides a protected self-contained computing environment used for running cryptographic algorithms as well as proprietary applications stored within the Token Manager 100. It also allows for storing data that is either never released to the Relying Party Terminal 120 or only released when specific access conditions, managed by the micro-processor of the Secure Element's 200, are met.

As shown, the Secure Element 200 is divided into a microprocessor area 300 and a protected memory area 320. The microprocessor area 300 provides processing capabilities such as cryptographic algorithms 305 and runs proprietary embedded applications 310, such as an Activation procedure application 312, a Registration procedure application 313, and an Authentication procedure application 314. Other embedded applications 310 may include an Enrolment procedure application (not shown). Preferably, the Activation procedure application 312, the Registration procedure application 313, the Authentication procedure application 314 and the Enrolment procedure application are implemented as a set of computer processing instructions that are executed by the microprocessor area 300. However, the functionality of the Activation procedure application 312, the Registration procedure application 313, the Authentication procedure application 314 and the Enrolment procedure application may instead be implemented in electronics hardware. For example, any of the Activation procedure application 312, the Registration procedure application 313, the Authentication procedure application 314 and the Enrolment procedure application may be implemented as a Field Programmable Gate Array (FPGA) or a Complex Program Logic Device (CPLD).

The protected memory area 320 is used to store sensitive information required for implementation of the methods described herein, and includes a unique Token Manager Serial Number 321, a Registration Database 325 and a Key Database 330. The Registration database 325 includes a Private Key Store 326 and a Certificate Store 327. The Key Database 330 includes the root certificate from a Trusted Certificate Authority, as well as an Activation Server certificate, a Registration Server certificate 331, a Token Manager Private Key Store 332 and a Token Manager Certificate Store 333.

The Mass-storage area 220 includes a read-only partition 340 and optionally a read-write partition 350. Preferably, the read-only partition 340 is exposed to the Relying Party Terminal 120 when the Token Manager 100 is connected to the Relying Party Terminal 120 and may include an Autorun file 341 and a Network Client 345. The Autorun file 341 contains the minimum instructions to allow the Relying Party Terminal 120 to run the Network Client 345. The Network Client 345 (when executed by the Relying Party Terminal 120) allows the Relying Party Terminal 120 to communicate with the Issuer Server 140 over the communications network 130, and to communicate directly with the Token Manager 100.

As discussed above, the Token Manager 100 is configured with an Activation procedure application 312, a Registration procedure application 313, and an Authentication procedure application 314. The Activation procedure application 312, the Registration procedure application 313, and the Authentication procedure application 314 respectively allow the Token Manager 100 to implement the aforementioned Activation process, Registration process, and Authentication process.

The Token Manager 100 is provided with a Distribution private encryption key DPrivK and a Distribution Public Certificate DPubC that are installed respectively in the Token Manager Private Key Store 332 and the Token Manager Certificate Store 333 when the Token Manager 100 is manufactured. DPubC includes a Distribution public encryption key DPubK corresponding to DPrivK. DPrivK and DPubK comprise an asymmetric encryption key pair. As will be explained in further detail below, the Activation process causes the Token Manager 100 also to be provided with a private encryption key UPrivK and a Certificate Authority-signed public certificate UPubC that includes a public encryption key UPubK corresponding to UPrivK.

The Registration process causes the Token Manager 100 to use UPubC to register the Token Manager 100 for use with one or more of the Credential Issuer Servers 140. The Authentication process causes the Token Manager 100 to use UPubC to authenticate a Hardware Token 110 to one of the Credential Issuer Servers 140.

Token Manager Activation

Figure 5:
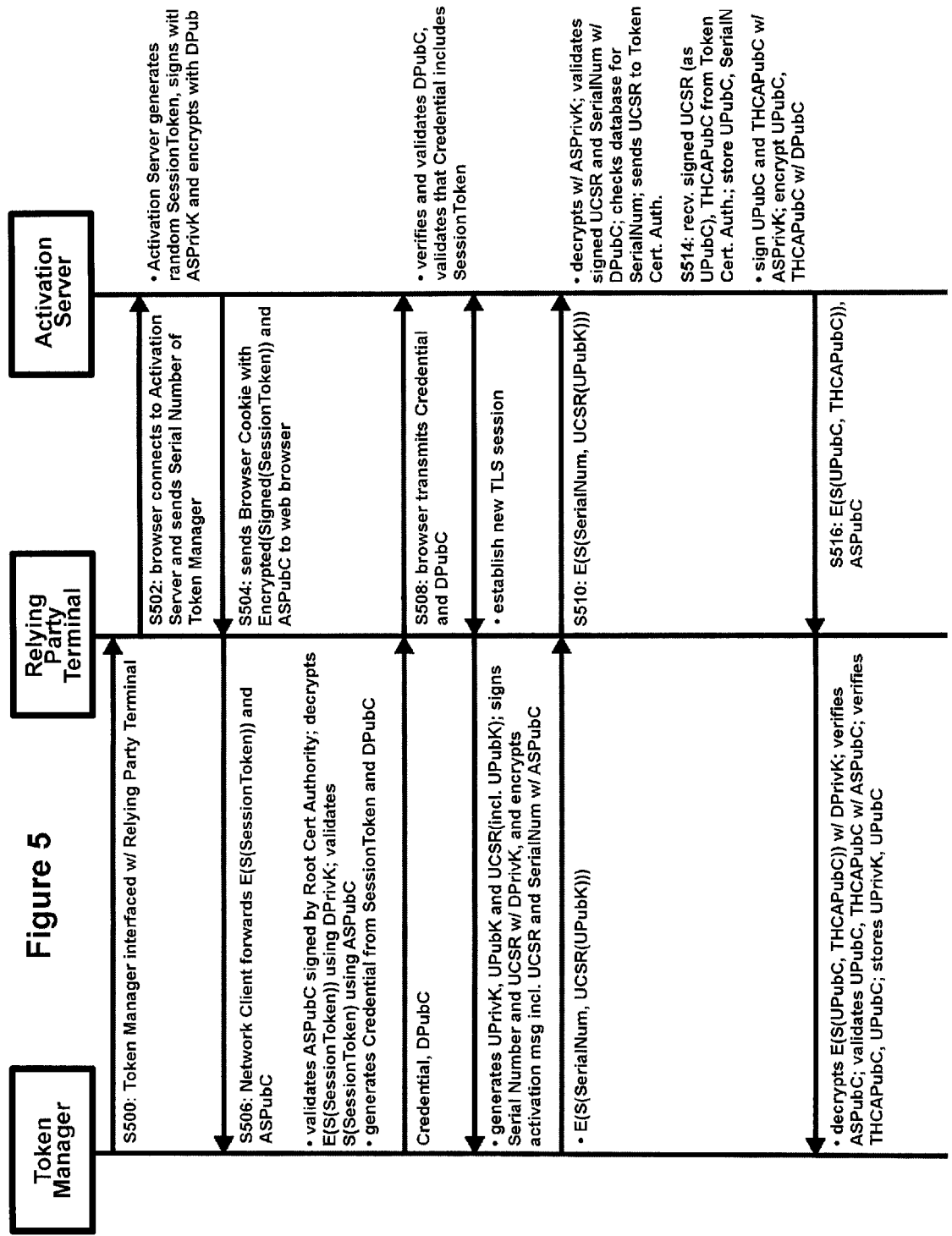
FIG. 5 is a message flow diagram that depicts the transmission of messages during the Activation process of the first embodiment of the identity attribute validation system.

The Activation process will now be described with reference to FIG. 5. The Activation process is initiated, at step S500, when a Relying Party interfaces an un-activated Token Manager 100 with the Relying Party Terminal 120. At step S502, the Network Client 345 (loaded into memory of the Relying Party Terminal 120 from the Token Manager 100) starts a new session of the web browser 400, connects to the Activation Server 150 (typically over a server side SSL/TLS encrypted communication channel) and sends the Serial Number 321 of the Token Manager 100 to the Activation Server 150 for identification purposes.

In response, the Activation Server 150 generates a session token, and may sign the session token using the Activation Server's private encryption key ASPrivK. As used in this description, a session token is an artefact, such as a random number, that the issuing server uses to identify the current session. The Activation Server 150 may then generate an encrypted activation message by encrypting the signed session token with DPubC. The Activation Server 150 may embed the encrypted activation message and the Activation Server's Public Certificate ASPubC in a browser cookie, and send the cookie to the web browser 400, at step S504.

At step S506, the Network Client 345 forwards the encrypted activation message and ASPubC to the Token Manager 100. Upon receipt, the Token Manager 100 validates ASPubC by verifying that ASPubC was signed by a Root Certificate Authority. If validated, the Token Manager 100 decrypts the encrypted activation message using DPrivK. Otherwise, an error is generated and the Activation process aborts.

The Token Manager 100 then validates the signed session token using ASPubC. After the activation message has been validated, the Token Manager 100 or the Network Client 345 (running on the Relying Party Terminal 120) generates a credential from DPubC.

The credential may be implemented as a digital certificate or as a pseudo-random code. To implement the credential as a digital certificate, the Token Manager 100 or the Network Client 345 may generate a Session private encryption key SPrivK and a Session public encryption key SPubK. SPrivK and SPubK comprise an asymmetric encryption key pair. The Token Manager 100 or the Network Client 345 may then generate a Session Certificate SCert that includes SPubK, the session token that was received from the Activation Server 150, and the distinguished name (DN) of DPubC. The Token Manager 100 or the Network Client 345 then signs SCert with DPrivK.

The Network Client 345 stores SCert and DPubC in the Certificate Store 405, and stores the SPrivK in the Key Store 410. Since SCert is signed with DPrivK, SCert is uniquely associated with the Token Manager 100 in the sense that no other Token Manager 100 could have generated the credential.

To implement the credential as a pseudo-random code, the Token Manager 100 may use a suitable application, such as a One-Time-Password (OTP) application, to generate pseudo-random number. The Token Manager 100 or the Network Client 345 may sign the pseudo-random code and the session token with DPrivK. Since the pseudo-random code and session token is signed with DPrivK, the pseudo-random code is uniquely associated with the Token Manager 100 in the sense that no other Token Manager 100 could have generated the credential.

The Network Client 345 then uses the browser 400 to transmit the credential and DPubC to the Activation Server 150, at step S508. The Activation Server 150 verifies that DPubC was signed by the Root Certificate Authority and, if verified, validates the credential using DPubC. The Activation Server 150 may also validate the credential by verifying that the session token included in the credential matches the session token transmitted by the Activation Server 150. If the credential included a pseudo-random code, the Activation Server 150 may also validate the credential by comparing the pseudo-random code against an expected value for the pseudo-random code.

After the Activation Server 150 successfully validates the credential, the Activation Server 150 establishes an encrypted session with the web browser 400, using ASPubC, in the conventional manner. Preferably, the browser 400 and the Activation Server 150 establish a mutually-authenticated encrypted TLS session. If the credential comprises SCert, preferably the browser 400 and the Activation Server 150 establish the mutually authenticated TLS session using SCert and ASPubC. If the credential comprises the pseudo-random code instead of SCert, the Network Client 345 may provide the Activation Server 150 with DPubC to facilitate establishment of the mutually authenticated session. Further, preferably the Token Manager 100 and the Activation Server 150 establish a mutually-authenticated encrypted session, such as a GlobalPlatform Secure Channel Protocol (SCP) session, within the TLS session, to thereby encrypt communications between the Token Manager 100 and the Activation Server 150.

If the browser 400 and the Activation Server 150 are unable to establish a mutually-authenticated encrypted session, an error is generated and the Activation process aborts. However, if the session is successfully established, the Token Manager 100 generates a new Private Key UPrivK and a corresponding Public Key UPubK, and stores UPrivK and UPubK respectively in the Private Key Store 326 and the Certificate store 327. UPrivK and UPubK comprise an asymmetric encryption key pair. UPrivK and UPubK are uniquely associated with the Token Manager 100.

The Token Manager 100 or the Network Client 345 generates a Certificate Signing Request UCSR for the creation of a Public Certificate UPubC based on UPubK. The Certificate Signing Request UCSR includes UPubK. The Token Manager 100 or the Network Client 345 also signs UCSR and the Token Manager Serial Number 321 with DPrivK. Preferably, the Token Manager 100 or the Network Client 345 then generates an encrypted activation message by encrypting the signed UCSR and Serial Number 321 with ASPubC.

At step S510, the Network Client 345 uses the browser 400 to transmit the encrypted activation message to the Activation Server 150. The Activation Server 150 decrypts the encrypted activation message using ASPrivK, and validates the signed UCSR and Serial Number 321 using DPubC. After the Activation Server 150 has validated the signed UCSR and Serial Number 321, the Activation Server 150 determines whether the received Serial Number 321 is valid by querying the Activation Database 535 for the Serial Number 321.

If the Token Manager Serial Number 321 is invalid, an error is raised and the Activation process aborts. Otherwise, at step S512, the Activation Server 150 transmits the UCSR to the Certificate Authority 170 for signing. The Certificate Authority 170 signs the UCSR, and returns the resulting Certificate Authority-signed Public Certificate UPubC, together with the Certificate Authority's Public Certificate THCAPubC, to the Activation Server 150 at step S514. The Activation Server 150 stores UPubC in the Activation Database 535, together with the Token Manager Serial Number 321.

The Activation Server 150 signs the UPubC and THCA-PubC with ASPrivK. The Activation Server 150 then uses DPubC to encrypt the UPubC and THCAPubC. At step S516, the Activation Server 150 transmits the encrypted message to the Network Client 345, together with ASPubC.

The Token Manager 100 or the Network Client 345 decrypts the encrypted message using DPrivK, and verifies that ASPubC was signed by the Root Certificate Authority. If verified, the Token Manager 100 or the Network Client 345 validates UPubC and THCAPubC using ASPubC.

If UPubC and THCAPubC are validated, the Token Manager 100 or the Network Client 345 verifies that THCAPubC was signed by the Root Certificate Authority. If verified, the Token Manager 100 or the Network Client 345 uses THCA-PubC to verify that UPubC was signed by the Certificate Authority 170. If the signature on the UPubC is invalid, an error is raised and the Activation process aborts. Otherwise, the Token Manager 100 saves UPrivK in the Private Key Store 326, and saves UPubC in the Certificate store 327. Since UPrivK and UPubK are uniquely associated with the Token Manager 100, UPubC is also uniquely associated with the Token Manager 100.

Token Manager Registration

Figure 6:
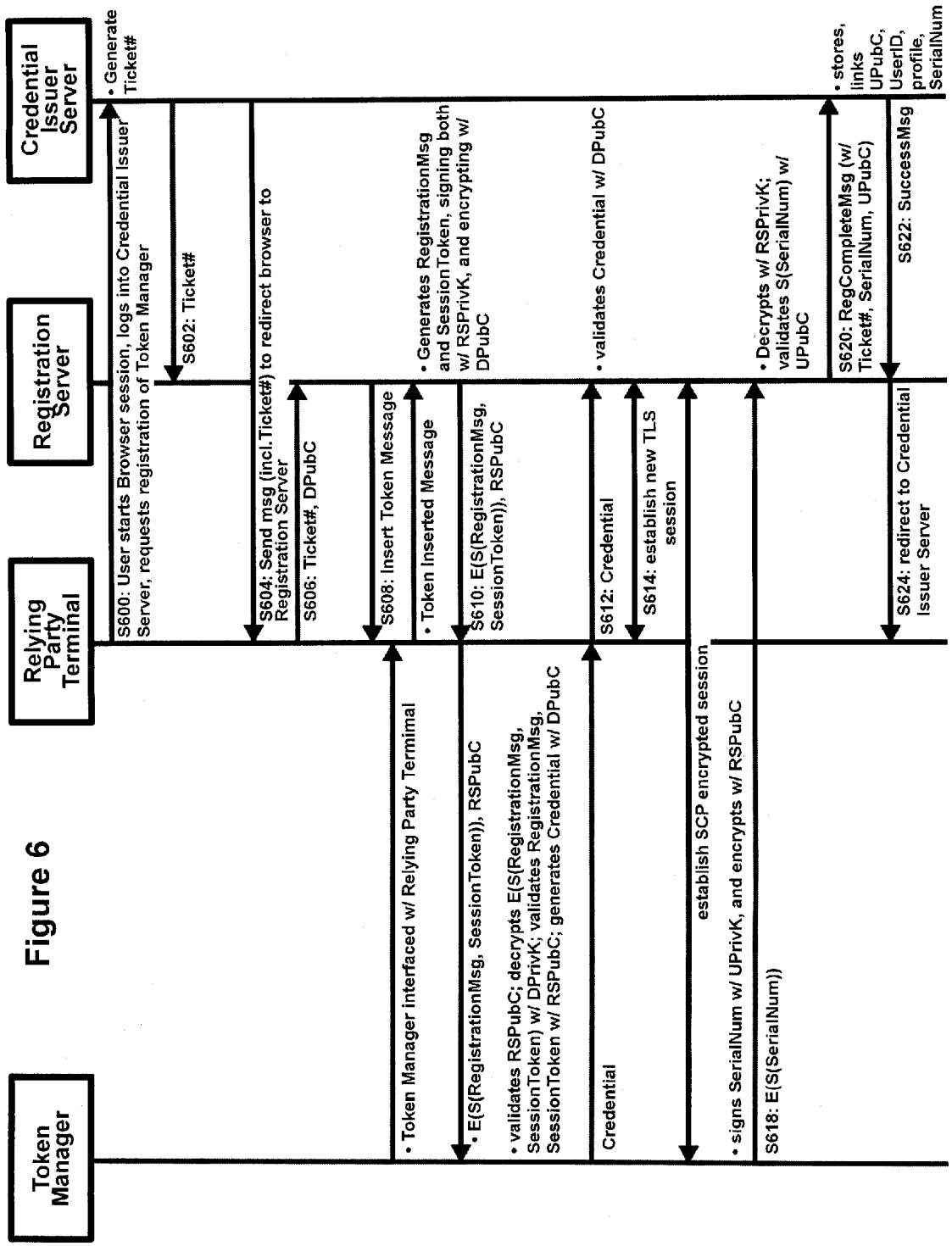
FIG. 6 is a message flow diagram that depicts the transmission of messages during the Registration process of the first embodiment of the identity attribute validation system.

The Registration process that is implemented by the Token Manager 100 will now be described with reference to FIG. 6. As discussed, at the time of manufacture the Token Manager 100 is provided with a Distribution Public Certificate DPubC and a corresponding Distribution private encryption key DPrivK. The Activation process provides the Token Manager 100 with a private encryption key UPrivK and a Public Certificate UPubC that includes a public encryption key UPubK corresponding to UPrivK.

The Token Manager 100 uses UPubC to register the Token Manager 100 for use with one of the Credential Issuer Servers 140. The Registration process causes the Credential Issuer Server 140 to be provided with a copy of UPubC, and to associate UPubC with the Token Manager Serial Number 321. The Registration process must be executed for each Credential Issuer Server 140 with which the Relying Party intends to use the Token Manager 100. UPubC is common to all of the Credential Issuer Servers 140 in the sense that the Token Manager 100 registers the same UPubC with each Credential Issuer Server 140.

The Registration Process is initiated, at step S600, when a Relying Party starts a new session of the web browser 400, logs in to a Credential Issuer Server 140 (typically over a server side SSL/TLS encrypted communication channel) using a UserID and password, and requests Registration of the Token Manager 100. Upon successful validation of the UserID, the Credential Issuer Server 140 determines whether the Credential Issuer has an attribute disclosure profile associated with the UserID. If no attribute disclosure profile has been established associated with the UserID, the Registration process aborts and the Relying Party must separately establish an attribute disclosure profile with the Credential Issuer.

However, if an attribute disclosure profile has been established for the Relying Party, at step S602 the Credential Issuer Server 140 generates a random Registration Ticket number, and transmits a registration message to the Registration Server 160, over a secure channel, which includes the assigned Registration Ticket number. At step S604, the Credential Issuer Server 140 issues to the browser 400 a redirection message that includes the Registration Ticket number, and redirects the browser 400 to the Registration Server 160.

The browser 400 connects to the Registration Server 160 (typically over a server side SSL/TLS encrypted communication channel) at step S606, and provides the Registration Server 160 with the received Registration Ticket number and DPubC. At step S608, the Registration Server 160 causes the computer browser 400 to display a message instructing the user to physically interface the Token Manager 100 with the Relying Party Terminal 120 (unless the Token Manager 100 is implemented as an internal device to the Relying Party Terminal 120).

After the Token Manager 100 is physically interfaced with the Relying Party Terminal 120, the Registration Server 160 generates a registration message RegistrationMsg, and a session token, such as a random session number, and may sign the registration message RegistrationMsg and the session token using the Registration Server's private encryption key RSPrivK.

The Registration Server 160 may then encrypt the signed registration message RegistrationMsg and the signed session token with DPubC. Preferably, the Registration Server 160 embeds the encrypted data and the Registration Server's Public Certificate RSPubC in a browser cookie, and sends the cookie to the browser 400, at step S610.

The Network Client 345 forwards the encrypted data and RSPubC to the Token Manager 100. Upon receipt, the Token Manager 100 or the Network Client 345 validates RSPubC by verifying that RSPubC was signed by a Root Certificate Authority. If validated, the Token Manager 100 decrypts the data using DPrivK; otherwise, an error is generated and the Registration process aborts.

The Token Manager 100 then validates the signed RegistrationMsg and session token using RSPubC. After the signed RegistrationMsg and session token have been validated, the Token Manager 100 or the Network Client 345 generates a credential from DPubC.

The credential may be implemented as a digital certificate or as a pseudo-random code. To implement the credential as a digital certificate, the Token Manager 100 or the Network Client 345 may generate a Session private encryption key SPrivK and a Session public encryption key SPubK. SPrivK and SPubK comprise an asymmetric encryption key pair. The Token Manager 100 or the Network Client 345 may then generate a Session Certificate SCert that includes SPubK, the session token that was received from the Registration Server 160, and the distinguished name (DN) of DPubC. The Token Manager 100 or the Network Client 345 then signs SCert with DPrivK.

The Network Client 345 stores SCert in the Certificate Store 405, and stores the SPrivK in the Key Store 410. Since SCert is signed with DPrivK, SCert is uniquely associated with the Token Manager 100 in the sense that no other Token Manager 100 could have generated the credential.

To implement the credential as a pseudo-random code, the Token Manager 100 may use a suitable application, such as a One-Time-Password (OTP) application, to generate pseudo-random number. The Token Manager 100 or the Network Client 345 may sign the pseudo-random code and the session token with DPrivK. Since the pseudo-random code and session token is signed with UPrivK, the pseudo-random code is uniquely associated with the Token Manager 100 in the sense that no other Token Manager 100 could have generated the credential.

The Network Client 345 then uses the browser 400 to transmit the credential to the Registration Server 160, at step S612. The Registration Server 160 validates the credential using DPubC, thereby verifying that the credential was generated from DPubC. The Registration Server 160 may also validate the credential by verifying that the session token included in the credential matches the session token transmitted by the Registration Server 160.

After the Registration Server 160 successfully validates the credential, at step S614 the Registration Server 160 establishes an encrypted session with the web browser 400, using RSPubC, in the conventional manner. Preferably, the browser 400 and the Registration Server 160 establish a mutually-authenticated encrypted TLS session. If the credential comprises SCert, preferably the browser 400 and the Registration Server 160 establish the mutually authenticated TLS session using SCert and RSPubC. If the credential comprises the pseudo-random code instead of SCert, the Network Client 345 may provide the Registration Server 160 with DPubC to facilitate establishment of the mutually authenticated session. Further, preferably the Token Manager 100 and the Registration Server 160 establish a mutually-authenticated encrypted session, such as a GlobalPlatform Secure Channel Protocol (SCP) session, within the TLS session, to thereby encrypt communications between the Token Manager 100 and the Registration Server 160.

If the browser 400 and the Registration Server 160 are unable to establish a mutually-authenticated encrypted session, an error is generated and the Activation process aborts. However, if the session is successfully established, the Token Manager 100 or the Network Client 345 signs the Token Manager Serial Number 321 with the UPrivK. Preferably, the Token Manager 100 or the Network Client 345 then generates an encrypted registration message by encrypting the signed Token Manager Serial Number 321 with RSPubC.

At step S618, the Network Client 345 uses the browser 400 to transmit the encrypted registration message and UPubC to the Registration Server 160. The Registration Server 160 decrypts the encrypted registration message using RSPrivK, and validates the signed Serial Number 321 using UPubC. After the Registration Server 160 has validated this data, at step S620 the Registration Server 160 transmits to the Credential Issuer Server 140, over a secure channel, a Registration Completion message that includes the Registration Ticket number (previously transmitted by the browser 400 to the Registration Server 160 at step S606), the Token Manager Serial Number 321, and UPubC.

If the Credential Issuer Server 140 did not generate the Registration Ticket number, an error is raised and the Registration process aborts. Otherwise, the Credential Issuer Server 140 saves UPubC in the Registered User Database 520, and links the Token Manager Serial Number 321 and the Relying Party's attribute disclosure profile to UPubC via the UserID. The Credential Issuer Server 140 also updates the Registered User Database 520 with the user's UserID and Token Manager Serial Number 321, to indicate that the user has registered a Token Manager 100 with the Credential Issuer.

At step S622, the Credential Issuer Server 140 issues the Registration Server 160 a Successful Update Notification message, whereupon, at step S624, the Registration Server 160 redirects the browser 400 back to the Credential Issuer Server 140, and the Registration process ends.

Hardware Token Authentication (Embodiment #1)

Figure 7:
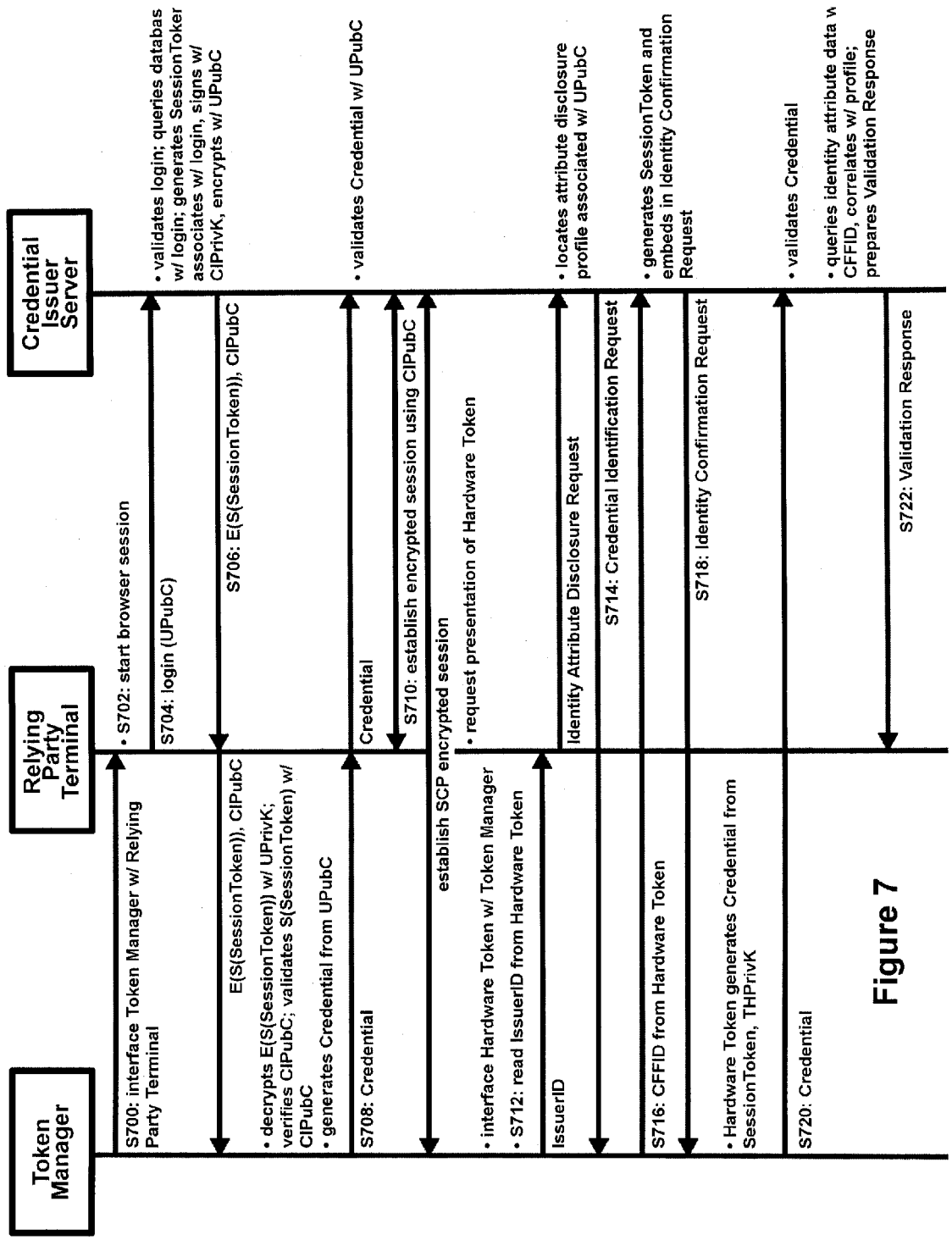
FIG. 7 is a message flow diagram that depicts the transmission of messages during the Authentication process of the first embodiment of the identity attribute validation system.

The Authentication process that is implemented by the Token Manager 100 will now be described with reference to FIG. 7. As discussed, the Activation process provides the Token Manager 100 with a private encryption key UPrivK and a Public Certificate UPubC that includes a public encryption key UPubK corresponding to UPrivK. The Registration processes provides each Credential Issuer Server 140 with a copy of UPubC, and causes each Credential Issuer Server 140 to associate UPubC with the Token Manager Serial Number 321.

Also, as discussed, the Credential Issuer Server 140 is configured with records identifying attributes data associated with each Hardware Token 110, and an attribute disclosure profile that identifies, for each Relying Party, the scope of the attributes data (associated with the Hardware Token 110) authorized for disclosure to the associated Relying Party Terminal 120. During the Authentication process, after the Token Manager 100 has mutually authenticated with the Credential Issuer Server 140, the Credential Issuer Server 140 receives an identity attribute validation request from a Relying Party Terminal 120.

The Credential Issuer Server 140 determines the validity of a credential (e.g. by verifying that the credential was generated by the Hardware Token 110 from an artefact that is transmitted to the Hardware Token 110 from the Credential Issuer Server 140), and provides the Relying Party Terminal 120 with a response to the identity attribute validation request based on an outcome of the credential validity determination. The attribute validation response may include attributes data associated with the Hardware Token 110 authorized for disclosure to the Relying Party by the Relying Party's attribute disclosure profile, but excluding attributes data associated with the Hardware Token 110 not authorized for disclosure to the Relying Party by the Relying Party's attribute disclosure profile. The attribute validation response may indicate whether the credential was validated.

The Authentication Process is initiated, at step S700 when the Token Manager 100 is interfaced with the Relying Party Terminal 120. The Relying Party Terminal 120 starts a new session of the web browser 400 at step S702, and logs in to one of the Credential Issuer Servers 140 (typically over a server side SSL/TLS encrypted communication channel) at step S704 by providing the Relying Party's UPubC. The Credential Issuer Server 140 then verifies that UPubC was signed by the Root Certificate Authority.

As discussed above, the Relying Party Terminal 120 may be implemented as a POS terminal or portable device. To limit unauthorized use of the Relying Party Terminal 120 as an attribute authentication device after UPubC has been installed on the Relying Party Terminal 120, it may be advantageous to require the Relying Party to re-register with the identity attribute validation system at the start of each business day. Accordingly, in one variation, the ValidFrom and ValidTo time/date fields of the UPubC may provide UPubC with a short lifespan (e.g. 24 hours) and, at the start of the Authentication process the Credential Issuer Server 140 also verifies that UPubC has not expired or otherwise been revoked.

If the signature of UPubC is verified, and UPubC has not expired/revoked, the Credential Issuer Server 140 determines whether the Relying Party has previously registered a Token Manager 100 with the Credential Issuer Server 140. To do so, the Credential Issuer Server 140 queries the Registered User Database 520 with the UPubC. If the user has not registered a Token Manager 100 with the Credential Issuer Server 140, the Authentication process ends. However, if the Relying Party has registered a Token Manager 100 with the Credential Issuer Server 140, the Credential Issuer Server 140 generates a session token, such as a random session number, and associates the session token with the UPubC. The Credential Issuer Server 140 may sign the session token with the Credential Issuer Server's private key CIPrivK.

The Credential Issuer Server 140 may then generate an encrypted authentication message by encrypting the signed session token with UPubC. Preferably, the Credential Issuer Server 140 embeds the encrypted data and CIPubC in a browser cookie, and sends the cookie to the browser 400, at step S706.

The Network Client 345 forwards the encrypted data and CIPubC to the Token Manager 100. Upon receipt, the Token Manager 100 decrypts the authentication message using UPrivK, and then verifies that CIPubC was signed by the Root Certificate Authority. If verified, the Token Manager 100 validates the signed session token using CIPubC. The Token Manager 100 or the Network Client 345 then generates a credential from UPubC.

The credential may be implemented as a digital certificate or as a pseudo-random code. To implement the credential as a digital certificate, the Token Manager 100 or the Network Client 345 may generate a Session private encryption key SPrivK and a Session public encryption key SPubK. SPrivK and SPubK comprise an asymmetric encryption key pair. The Token Manager 100 or the Network Client 345 may then generate a Session Certificate SCert that includes SPubK, the session token that was received from the Credential Issuer Server 140, the Token Manager Serial Number 321, and the distinguished name (DN) of UPubC. The Token Manager 100 or the Network Client 345 then signs SCert with UPrivK.

The Network Client 345 stores SCert in the Certificate Store 405, and stores the SPrivK in the Key Store 410. Since SCert is signed with UPrivK, SCert is uniquely associated with the Token Manager 100 in the sense that no other Token Manager 100 could have generated the credential.

To implement the credential as a pseudo-random code, the Token Manager 100 may use a suitable application, such as a One-Time-Password (OTP) application, to generate pseudo-random number. The Token Manager 100 or the Network Client 345 may sign the pseudo-random code, the Token Manager Serial Number 321, and the session token with UPrivK. Since the pseudo-random code, Serial Number 321 and session token is signed with UPrivK, the signed data is uniquely associated with the Token Manager 100 in the sense that no other Token Manager 100 could have generated the credential.

The Network Client 345 then uses the browser 400 to transmit the credential to the Credential Issuer Server 140, at step S708. The Credential Issuer Server 140 validates the credential using UPubC, thereby verifying that the credential was generated from UPubC and is uniquely associated with the Token Manager 100. If the credential included a pseudo-random code, the Credential Issuer Server 140 may also validate the credential by comparing the pseudo-random code against an expected value for the pseudo-random code. Optionally, the Credential Issuer Server 140 also validates the credential by verifying that the Serial Number 321 that was included in the credential was associated with the Token Manager 100 (via the UserID) during the Registration process.

The Credential Issuer 140 also validates the credential by verifying that the session token included in the credential matches the session token transmitted by the Credential Issuer Server 140. The Credential Issuer 140 may also verify that it had associated UPubC with the received session token, and that the association is still valid.

If the credential is validated, at step S710 the Credential Issuer Server 140 establishes an encrypted session with the web browser 400, using CIPubC, in the conventional manner. Preferably, the browser 400 and the Credential Issuer Server 140 establish a mutually-authenticated encrypted TLS session. If the credential comprises SCert, preferably the browser 400 and the Credential Issuer Server 140 establish the mutually authenticated TLS session using SCert and CIPubC. If the credential comprises the pseudo-random code instead of SCert, the Network Client 345 may provide the Credential Issuer Server 140 with a public certificate of the Token Manager 100, such as the User Certificate UPubC, to facilitate establishment of the mutually authenticated session. Further, preferably the Token Manager 100 and the Credential Issuer Server 140 establish a mutually-authenticated encrypted session, such as a GlobalPlatform Secure Channel Protocol (SCP) session, within the TLS session, to thereby encrypt communications between the Token Manager 100 and the Credential Issuer Server 140.

If the browser 400, Token Manager 100 and the Credential Issuer Server 140 are unable to establish a mutually-authenticated encrypted session, an error is generated and the Authentication process aborts. However, if the encrypted sessions are successfully established, the Network Client 345 causes the browser 400 to display a message instructing a bearer of a Hardware Token 110 to physically interface the Hardware Token 110 with the Relying Party Terminal 120. To ensure that each Credential Issuer Server 140 with which the Relying Party has registered the Token Manager 100 is available for use in the Authentication process, the Relying Party should execute Steps S700 to S710 for each such Credential Issuer Server 140.

After the encrypted sessions have been established between the Token Manager 100 and each of the Credential Issuer Servers 140, the Token Manager 100 is available for use in the Authentication process by each Credential Issuer. Thereafter, when a Hardware Token 110 is physically interfaced with the Token Manager 100, at step S712 the Token Manager 100 may read the Credential Issuer Identifier from the Hardware Token 110 (identifying the Credential Issuer that issued the Hardware Token 110). Using the Credential Issuer Identifier, the Network Client 345 may transmit an Identity Attribute Disclosure Request message (via the web browser 400) to the Credential Issuer Server 140 of the Credential Issuer that issued the Hardware Token 110. Alternately, the bearer of the Hardware Token 110 may use the web browser 400 of the Relying Party Terminal 120 to transmit an Identity Attribute Disclosure message to the Credential Issuer Server 140 of the Credential Issuer that issued the Hardware Token 110. The Identity Attribute Disclosure message may comprise a blanket request for all identity attributes associated with the Hardware Token 110, or may request specific identity attributes associated with the Hardware Token 110.

In response, the Credential Issuer Server 140 locates the attribute disclosure profile that is associated with the UPubC to determine whether the associated Relying Party is entitled to disclosure of the identity attributes (if any) specified in the Identity Attribute Disclosure message. If the Relying Party is not entitled to disclosure of the specified identity attributes, the Authentication process aborts. Otherwise, the Credential Issuer Server 140 generates a credential identification request message, and sends the credential identification request message to the Token Manager 100 via the SCP session, at step S714.

The Token Manager 100 forwards the credential identification request message to the Hardware Token 110. Upon receipt, the Hardware Token 110 responds to the Token Manager 100 with the unique identifier (CFFID) of the Hardware Token 110. The Token Manager 100 then responds to the credential identification request message by transmitting the CFFID to the Credential Issuer 140 via the SCP session, at step S716.

The Credential Issuer Server 140 uses the CFFID to determine whether the Credential Issuer had issued the Hardware Token 110. If the Credential Issuer did not issue a Hardware Token 110 having the received CFFID, the Authentication process aborts. Otherwise, the Credential Issuer Server 140 generates a session token, such as a random session number, embeds the session token in an identity confirmation request message, and sends the identity confirmation request message to the Token Manager 100 via the SCP session, at step S718.

The Token Manager 100 forwards the identity confirmation request message to the Hardware Token 110. Upon receipt, the Hardware Token 110 generates a credential that includes card presence data. The card presence data may comprise a pseudo-random code, such as a One-Time Password (OTP), or a static secret, and may be generated by a Chip Authentication Program application on the Hardware Token 110.

The card presence data may also comprise dynamically-generated data. The dynamically-generated data may comprise a cryptogram, that is generated from data originating from the Credential Issuer 140. The Hardware Token 110 may generate the cryptogram by signing the session token (received from the Credential Issuer 140) with THPrivK. Alternately, the Hardware Token 110 may generate the dynamically-generated data from the session token, an internal card counter number of the Hardware Token 110, and a diversified key (such as a triple-DES (Data Encryption Standard) key) of the Hardware Token 110.

When complete, the Hardware Token 110 sends the credential to the Token Manager 100. The Token Manager 100 then responds to the identity confirmation request message by transmitting the credential to the Credential Issuer 140 via the SCP session, at step S720. Therefore, the Credential Issuer Server 140 receives the credential over a communication channel that is distinct and different from the communication channel over which the Credential Issuer Server 140 received the Identity Attribute Disclosure Request message. Since the credential is derived from the session token that was received from the Credential Issuer Server 140, the credential is uniquely associated with the Credential Issuer Server 140, in the sense that no other credential would have this session token. Further, since the credential includes card presence data, the credential is uniquely associated with the Hardware Token 110, and is also uniquely associated with the Hardware Token 110 and the Credential Issuer Server 140 in the sense that the credential is only associated with this combination of Hardware Token 110 and Credential Issuer Server 140.

Upon receipt of the credential, the Credential Issuer Server 140 validates the credential by comparing the card presence data against an expected value for the card presence data. This latter step allows the Credential Issuer Server 140 to verify that the Hardware Token 110 was actually presented during the Authentication process and generated the credential from the session token. If the card presence data comprises a pseudo-random code or a static secret, the Credential Issuer Server 140 validates the credential by comparing the pseudo-random code or static secret against an expected value. The Credential Issuer Server 140 may also validate the credential by verifying that the credential is still in force.

If the credential comprises dynamically-generated card presence data, generated by signing the session token, the Credential Issuer Server 140 may validate the credential using the THPubC that the Credential Issuer 140 associates with the CFFID that was received at step S716. If the card presence data was dynamically-generated from a diversified key, the Credential Issuer Server 140 typically already has a copy of the diversified key of the Hardware Token 110, and validates the credential by generating a reference value from the random number, the internal card counter number and the Credential Issuer's copy of the diversified key, and comparing the reference value against the received dynamically-generated data.

If the credential cannot be validated, an error is raised and the Authentication process aborts. Otherwise, the Credential Issuer Server 140 determines from the Relying Party's attribute disclosure profile the attributes authorized to be disclosed to the Relying Party. The Credential Issuer Server 140 then queries the attributes data with the CFFID and correlates the result with the list of authorized attributes for the attributes data associated with the CFFID that are authorized for disclosure to the Relying Party.

The Credential Issuer Server 140 then generates a Validation Response message that includes the attributes data associated with the CFFID authorized for disclosure to the Relying Party, and does not include attributes data associated with the CFFID not authorized for disclosure to the Relying Party. The attributes data included in the Validation Response message may include all or a subset of the attributes data associated with the CFFID. The attributes data may be expressed in the Validation Response message in absolute terms or relative to a requirement of the Relying Party. For example, the attributes data might simply indicate that the credential was validated. The attributes data may be expressed in both absolute and relative terms. For example, the attributes data might indicate compliance with a requirement of the Relying Party, and also provide data to substantiate that indication. At step S722, the Credential Issuer Server 140 responds to the Identity Attribute Disclosure message by transmitting the Validation Response message to the Relying Party Terminal 120.

As discussed above, the Relying Party Terminal 120 might maintain its own attribute disclosure profile of attributes authorized for disclosure to the Relying Party Terminal 120. Further, the Validation Response message might simply indicate whether the credential received from the Hardware Token 110 was validated. Accordingly, in one variation where the Validation Response message indicates that the credential was authorized, the Relying Party Terminal 120 might interrogate the Hardware Token 110 for the attributes data authorized by the attribute disclosure profile maintained by the Relying Party Terminal 120.

The Relying Party Terminal 120 then generates an authorization signal based on the Validation Response message. If the attributes data (whether received from the Credential Issuer Server 140 or the Hardware Token 110) is expressed in absolute terms, the authorization signal might comprise a message disclosing the attributes data included in the attribute validation response. In the variation where the attributes data is expressed relative to requirements of the Relying Party, the authorization signal might comprise a tone or a message indicating whether the bearer of the Hardware Token 110 meets these requirements.

Identity Attribute Validation System (Embodiment #2)

Figure 8:
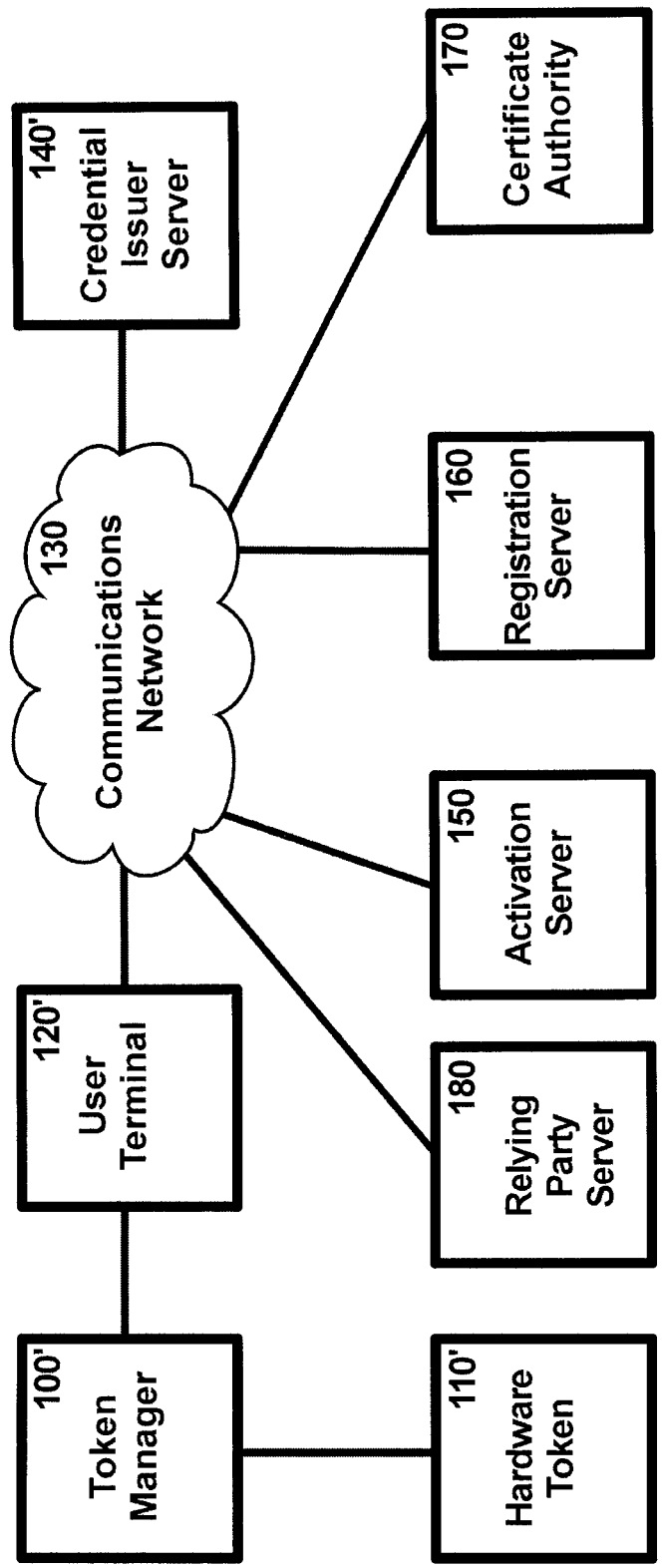
FIG. 8 is a block diagram illustrating a second embodiment of the identity attribute validation system.

Turning to FIG. 8, there is shown a second embodiment of the identity attribute validation system, comprising a Token Manager 100', the Hardware Token 110, a User Terminal 120', one or more Credential Issuer Servers 140', the Activation Server 150, the Registration Server 160, the Certificate Authority 170 and one or more Relying Party Servers 180. Although the User Terminal 120', Credential Issuer Server 140', Activation Server 150, Registration Server 160, Certificate Authority 170 and Relying Party Server 180 are shown being interconnected by a single communications network 130, the communications network 130 may comprise one or more different networks.

In this second embodiment of the identity attribute validation system, an enterprise (Relying Party) that requires access to the identity attribute validation system deploys the Relying Party Server 180 (instead of the Relying Party Terminal 120). The bearer of the Hardware Token 110 is also provided with the Token Manager 100' and a User Terminal 120'.

The Token Manager 100' has substantially the same implementation as the Token Manager 100 (of the first embodiment of the identity attribute validation system). As in the first embodiment, the Token Manager 100' implements an Activation process, a Registration process, and an Authentication process. The Activation and Registration processes implemented by the Token Manager 100' are the same respectively as the Activation and Registration processes implemented by the Token Manager 100.

Therefore, the Activation process implemented by the Token Manager 100' provides the Token Manager 100' with a private encryption key UPrivK and a Public Certificate UPubC that includes a public encryption key UPubK corresponding to UPrivK. The Registration process implemented by the Token Manager 100' provides each Credential Issuer Server 140 with a copy of UPubC, and causes each Credential Issuer Server 140 to associate UPubC with the Token Manager Serial Number 321.

As in the first embodiment, the Authentication process implemented by the Token Manager 100' causes the Token Manager 100' to use UPubC to authenticate a Hardware Token 110 to one of the Credential Issuer Servers 140. However, the implementation of the Authentication process in the second embodiment differs from the implementation in the first embodiment. Further, prior to the Authentication process, the Token Manager 100' implements an Enrolment process (substantially identical to the Authentication process). Therefore, the Enrolment and Authentication processes implemented by the Token Manager 100' will be discussed in further detail below.

The User Terminal 120' has substantially the same implementation as the Relying Party Terminal 120 (of the first embodiment of the identity attribute validation system) and, therefore need not be shown in detail. The Relying Party Server 180 is also similar to the Relying Party Terminal 120. However instead of being configured with a UPrivK and UPubC, the Relying Party Server 180 is configured with a Relying Party private encryption key RPPrivK, and a Relying Party Public Certificate RPPubC that includes a Relying Party public encryption key RPPubK corresponding to RPPrivK. RPPrivK and RPPubK comprise an asymmetric encryption key pair.

The Credential Issuer Server 140' has substantially the same implementation as the Credential Issuer Server 140. Accordingly, consistent with the first embodiment, the Credential Issuer Server 140' is configured with records identifying one or more identity attributes associated with each Hardware Token 110. The Credential Issuer Server 140' may be configured with an attribute disclosure profile. However, in contrast to the first embodiment, the attribute disclosure profile implemented by the Credential Issuer Server 140' identifies, for each Relying Party, attributes that are authorized for disclosure to the associated Relying Party Server 180 (not the User Terminal 120').

Further, in contrast to the first embodiment, the Credential Issuer Server 140' maintains a copy of the RPPubC for each Relying Party, and associates each RPPubC with the attribute disclosure profile of the associated Relying Party. The Credential Issuer Server 140' may be provided with the RPPubC during a Relying Party registration process. The Relying Party registration process is similar to the Token Manager registration process described above and, therefore, will not be described further.

The Token Manager 100' and the User Terminal 120' are typically located in a common physical location remote location from the Relying Party Server 180. The bearer of the Hardware Token 110 (terminal user) engages the identity attribute validation system by interfacing the Token Manager 100' with the User Terminal 120', accessing the Relying Party Server 180 via the User Terminal 120', and interfacing the Hardware Token 110 with the Token Manager 100'.

Hardware Token Enrolment (Embodiment #2)

Figure 9A:
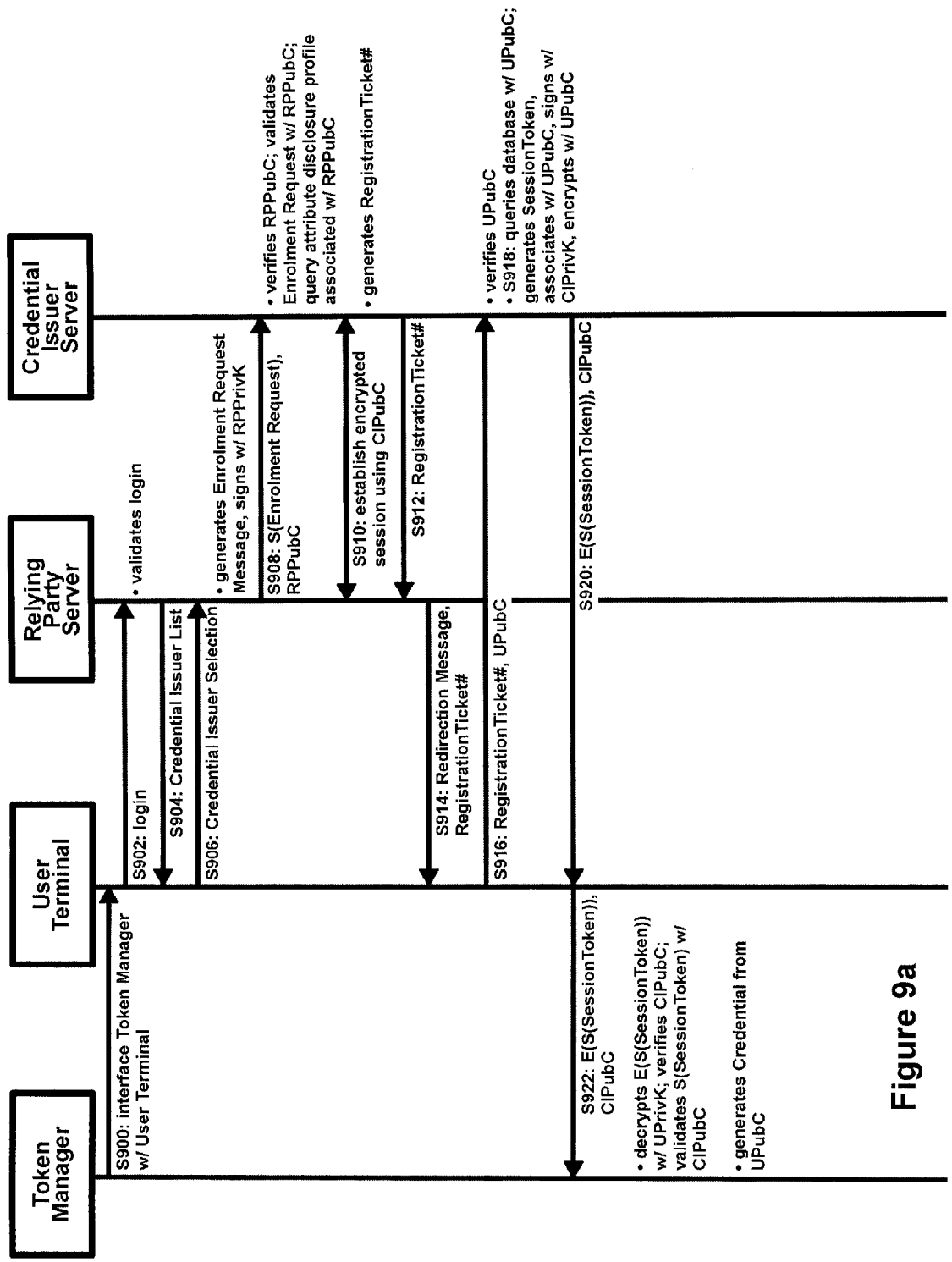
FIGS. 9a and 9b together comprise a message flow diagram that depicts the transmission of messages during the Enrolment process of the second embodiment of the identity attribute validation system.
Figure 9B:
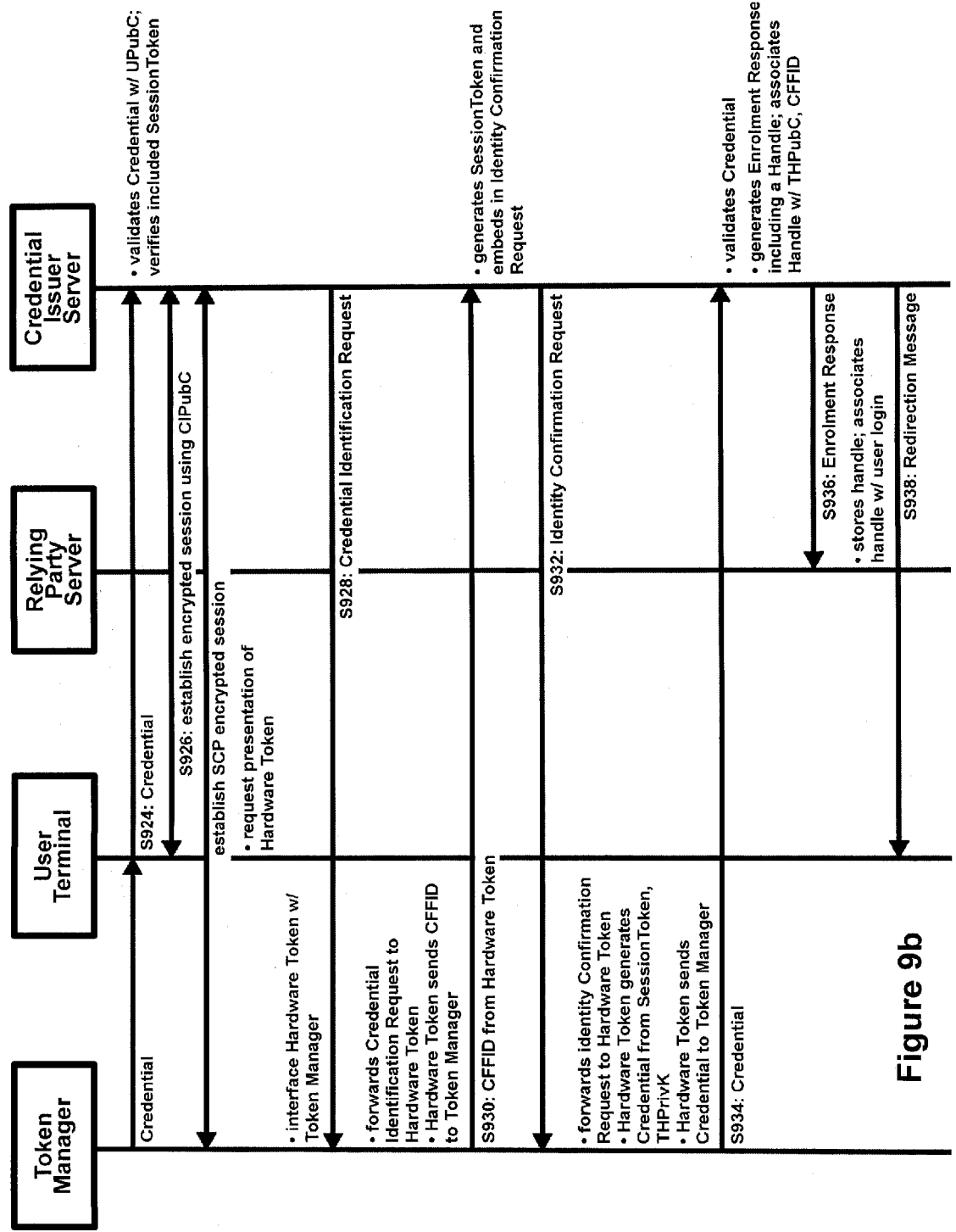

The Enrolment process that is implemented by the Token Manager 100' will now be described with reference to FIGS. 9a and 9b. During the Enrolment process, the Credential Issuer Server 140' receives an enrolment request from the Relying Party Server 180. The Credential Issuer Server 140 determines the validity of a credential (e.g. by verifying that the credential was generated by the Hardware Token 110 from an artefact that is transmitted to the Hardware Token 110 from the Credential Issuer Server 140'), and provides the Relying Party Server 180 with a response to the enrolment request based on an outcome of the credential validity determination. Typically, the enrolment response includes a unique identifier (handle) that the Credential Issuer and Relying Party will use during the Authentication process to subsequently anonymously identify the terminal user. Preferably, the enrolment response does not include any attributes data that unambiguously identify the identity of the terminal user.

The Enrolment process that is implemented by the Token Manager 100' is initiated, at step S900 when the terminal user interfaces the Token Manager 100' with the User Terminal 120'. The User Terminal 120' starts a new session of the web browser 400, and logs in to the Relying Party Server 180 (typically over a server side SSL/TLS encrypted communication channel) at step S902 by providing the terminal user's login credentials (e.g. a UserID and password).

The Relying Party Server 180 validates the terminal user's login credentials and, at step S904, presents a list of Credential Issuers with which the Relying Party has previously registered. At step S906, the terminal user uses the web browser 400 to select one of the listed Credential Issuers (preferably a Credential Issuer that previously issued a Hardware Token 110 to the terminal user). The Relying Party Server 180 generates an Enrolment Request message, and signs the Enrolment Request message with RPPrivK. At step S908, Relying Party Server 180 sends the Enrolment Request message and RPPubC to the Credential Issuer Server 140' of the selected Credential Issuer (typically over a SSL/TLS encrypted communication channel).

The Credential Issuer Server 140' verifies that RPPubC was signed by the Root Certificate Authority and, if verified, validates the Enrolment Request message using RPPubC, thereby verifying that the Enrolment Request message was generated by the Relying Party. If the Enrolment Request message is validated, the Credential Issuer Server 140' determines whether the Credential Issuer has an attribute disclosure profile associated with the RPPubC. If no attribute disclosure profile has been established associated with the RPPubC, the Enrolment process aborts and the Relying Party must separately establish an attribute disclosure profile with the Credential Issuer.

However, if an attribute disclosure profile has been established for the Relying Party, at step S910 the Credential Issuer Server 140' establishes an encrypted session with the Relying Party Server 180, using CIPubC, in the conventional manner. Preferably, the Relying Party Server 180 and the Credential Issuer Server 140' establish a mutually-authenticated encrypted TLS session using RPPubC and CIPubC.

The Credential Issuer Server 140' then generates a random Registration Ticket number and, at step S912, transmits to the Relying Party Server 180 an acknowledgment message, that includes the assigned Registration Ticket number. At step S914, the Relying Party Server 180 issues to the web browser 400 of the User Terminal 120' a redirection message that includes the Registration Ticket number, and redirects the browser 400 to the Credential Issuer Server 140'. The browser 400 connects to the Credential Issuer Server 140' (typically over a server side SSL/TLS encrypted communication channel) at step S916, and provides the Credential Issuer Server 140' with the received Registration Ticket number and UPubC of the Token Manager 100'.

The Credential Issuer Server 140' then verifies that UPubC was signed by the Root Certificate Authority. If verified, at step S918 the Credential Issuer Server 140' determines whether the terminal user has previously registered a Token Manager 100' with the Credential Issuer Server 140'. To do so, the Credential Issuer Server 140' queries the Registered User Database 520 with the terminal user's UPubC. If the terminal user has not registered a Token Manager 100' with the Credential Issuer Server 140', the Enrolment process ends. However, if the terminal user has registered a Token Manager 100' with the Credential Issuer Server 140', the Credential Issuer Server 140' generates a session token, such as a random session number, and associates the session token with UPubC. The Credential Issuer Server 140' may sign the session token with the Credential Issuer Server's private key CIPrivK.

The Credential Issuer Server 140' may then generate an encrypted authentication message by encrypting the signed session token with UPubC. Preferably, the Credential Issuer Server 140' embeds the encrypted data and CIPubC in a browser cookie, and sends the cookie to the browser 400, at step S920.

The Network Client 345 forwards the encrypted data and CIPubC to the Token Manager 100', at step S922. Upon receipt, the Token Manager 100' decrypts the authentication message using UPrivK, and then verifies that CIPubC was signed by the Root Certificate Authority. If verified, the Token Manager 100' validates the signed session token using CIPubC. The Token Manager 100' or the Network Client 345 then generates a credential from UPubC.

The credential may be implemented as a digital certificate or as a pseudo-random code. To implement the credential as a digital certificate, the Token Manager 100 or the Network Client 345 may generate a Session private encryption key SPrivK and a Session public encryption key SPubK. SPrivK and SPubK comprise an asymmetric encryption key pair. The Token Manager 100' or the Network Client 345 may then generate a Session Certificate SCert that includes SPubK, the session token that was received from the Credential Issuer Server 140', the Token Manager Serial Number 321, and the distinguished name (DN) of UPubC. The Token Manager 100' or the Network Client 345 then signs SCert with UPrivK.

The Network Client 345 stores SCert in the Certificate Store 405, and stores the SPrivK in the Key Store 410. Since SCert is signed with UPrivK, SCert is uniquely associated with the Token Manager 100' in the sense that no other Token Manager 100' could have generated the credential.

To implement the credential as a pseudo-random code, the Token Manager 100' may use a suitable application, such as a One-Time-Password (OTP) application, to generate pseudo-random number. The Token Manager 100' or the Network Client 345 may sign the pseudo-random code, the Token Manager Serial Number 321, and the session token with UPrivK. Since the pseudo-random code, Serial Number 321 and session token is signed with UPrivK, the signed data is uniquely associated with the Token Manager 100' in the sense that no other Token Manager 100' could have generated the credential.

The Network Client 345 then uses the browser 400 to transmit the credential and UPubC to the Credential Issuer Server 140', at step S924. The Credential Issuer Server 140' validates the credential using UPubC, thereby verifying that the credential was generated from UPubC and is uniquely associated with the Token Manager 100'. If the credential included a pseudo-random code, the Credential Issuer Server 140' may also validate the credential by comparing the pseudo-random code against an expected value for the pseudo-random code. Optionally, the Credential Issuer Server 140' also validates the credential by verifying that the Serial Number 321 that was included in the credential was associated with the Token Manager 100' (via UPubC) during the Registration process.

The Credential Issuer 140' also validates the credential by verifying that the session token included in the credential matches the session token transmitted by the Credential Issuer Server 140'. The Credential Issuer 140' may also verify that it had associated the received session token with UPubC and that the association is still valid.

If the credential is validated, at step S926 the Credential Issuer Server 140' establishes an encrypted session with the web browser 400, using CIPubC, in the conventional manner. Preferably, the browser 400 and the Credential Issuer Server 140' establish a mutually-authenticated encrypted TLS session. If the credential comprises SCert, preferably the browser 400 and the Credential Issuer Server 140' establish the mutually authenticated TLS session using SCert and CIPubC. If the credential comprises the pseudo-random code instead of SCert, the Network Client 345 may provide the Credential Issuer Server 140' with a public certificate of the Token Manager 100', such as the User Certificate UPubC, to facilitate establishment of the mutually authenticated session. Further, preferably the Token Manager 100' and the Credential Issuer Server 140' establish a mutually-authenticated encrypted session, such as a GlobalPlatform Secure Channel Protocol (SCP) session, within the TLS session, to thereby encrypt communications between the Token Manager 100' and the Credential Issuer Server 140'.

If the browser 400, Token Manager 100' and the Credential Issuer Server 140' are unable to establish a mutually-authenticated encrypted session, an error is generated and the Enrolment process aborts. However, if the encrypted sessions are successfully established, the Network Client 345 causes the browser 400 to display a message instructing the terminal user to physically interface a Hardware Token 110 with the User Terminal 120'.

After a Hardware Token 110 has been physically interfaced with the Token Manager 100', the Credential Issuer Server 140' generates a credential identification request message, and sends the credential identification request message to the Token Manager 100' via the SCP session, at step S928.

The Token Manager 100' forwards the credential identification request message to the Hardware Token 110. Upon receipt, the Hardware Token 110 responds to the Token Manager 100' with the unique identifier (CFFID) of the Hardware Token 110. The Token Manager 100' then responds to the credential identification request message by transmitting the CFFID to the Credential Issuer 140' via the SCP session, at step S930.

The Credential Issuer Server 140' uses the CFFID to determine whether the Credential Issuer had issued the Hardware Token 110. If the Credential Issuer did not issue a Hardware Token 110 having the received CFFID, the Enrolment process aborts. Otherwise, the Credential Issuer Server 140' generates a session token, such as a random session number, embeds the session token in an identity confirmation request message, and sends the identity confirmation request message to the Token Manager 100' via the SCP session, at step S932.

The Token Manager 100' forwards the identity confirmation request message to the Hardware Token 110. Upon receipt, the Hardware Token 110 generates a credential that includes card presence data. The card presence data may comprise a pseudo-random code, such as a One-Time Password (OTP), or a static secret, and may be generated by a Chip Authentication Program application on the Hardware Token 110.

The card presence data may also comprise dynamically-generated data. The dynamically-generated data may comprise a cryptogram, that is generated from data originating from the Credential Issuer 140'. The Hardware Token 110 may generate the cryptogram by signing the session token (received from the Credential Issuer 140) with THPrivK. Alternately, the Hardware Token 110 may generate the dynamically-generated data from the session token, an internal card counter number of the Hardware Token 110, and a diversified key (such as a triple-DES (Data Encryption Standard) key) of the Hardware Token 110.

When complete, the Hardware Token 110 sends the credential to the Token Manager 100'. The Token Manager 100 then responds to the identity confirmation request message by transmitting the credential to the Credential Issuer 140' via the SCP session, at step S934. Since the credential is derived from the session token that was received from the Credential Issuer Server 140', the credential is uniquely associated with the Credential Issuer Server 140', in the sense that no other credential would have this session token. Further, since the credential includes card presence data, the credential is uniquely associated with the Hardware Token 110, and is also uniquely associated with the Hardware Token 110 and the Credential Issuer Server 140' in the sense that the credential is only associated with this combination of Hardware Token 110 and Credential Issuer Server 140'.

Upon receipt of the credential, the Credential Issuer Server 140' validates the credential by comparing the card presence data against an expected value for the card presence data. This latter step allows the Credential Issuer Server 140' to verify that the Hardware Token 110 was actually presented during the Enrolment process and generated the credential from the session token. If the card presence data comprises a pseudo-random code or a static secret, the Credential Issuer Server 140' validates the credential by comparing the pseudo-random code or static secret against an expected value. The Credential Issuer Server 140' may also validate the credential by verifying that the credential is still in force.

If the credential comprises dynamically-generated card presence data, generated by signing the session token, the Credential Issuer Server 140' may validate the credential using the THPubC that the Credential Issuer 140' associates with the CFFID that was received at step S930. If the card presence data was dynamically-generated from a diversified key, the Credential Issuer Server 140' typically already has a copy of the diversified key of the Hardware Token 110, and validates the credential by generating a reference value from the random number, the internal card counter number and the Credential Issuer's copy of the diversified key, and comparing the reference value against the received dynamically-generated data.

If the credential cannot be validated, an error is raised and the Enrolment process aborts. Otherwise, the Credential Issuer Server 140' generates an Enrolment Response message that includes a random identifier number (handle), and associates the handle with THPubC and the CFFID that was received at step S930. At step S936, the Credential Issuer Server 140' responds to the Enrolment request message by transmitting the Enrolment Response message to the Relying Party Server 180. The Relying Party Server 180 saves the handle, and associates the handle with the terminal user's login credentials. As will become apparent, the Credential Issuer Server 140' uses the handle to anonymously identify the terminal user to the Relying Party Server 180. At step S938, the Credential Issuer Server 140' redirects the browser 400 back to the Relying Party Server 140', and the Enrolment process ends.

Hardware Token Authentication (Embodiment #2)

Figure 10A:
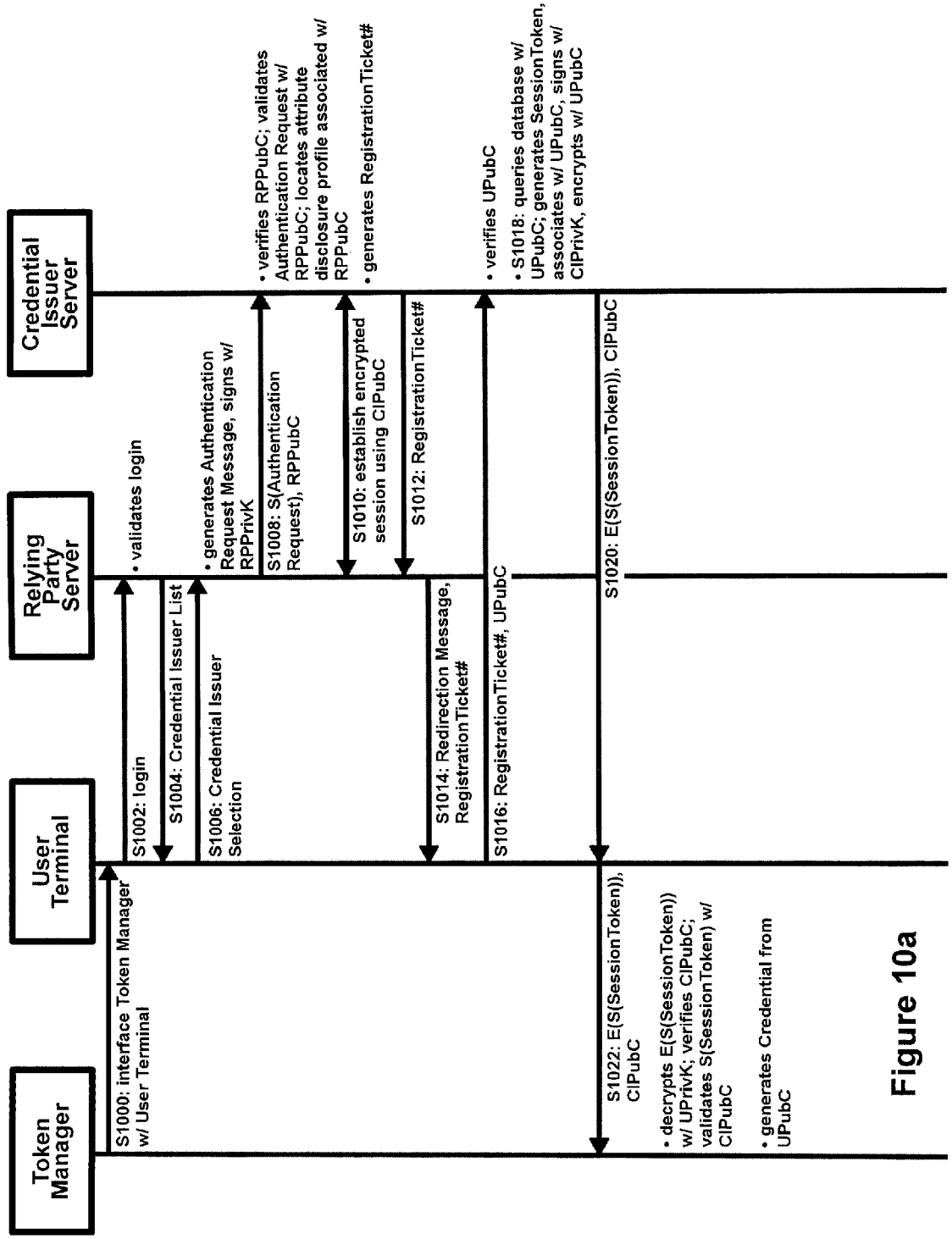
FIGS. 10a and 10b together comprise a message flow diagram that depicts the transmission of messages during the Authentication process of the second embodiment of the identity attribute validation system.
Figure 10B:
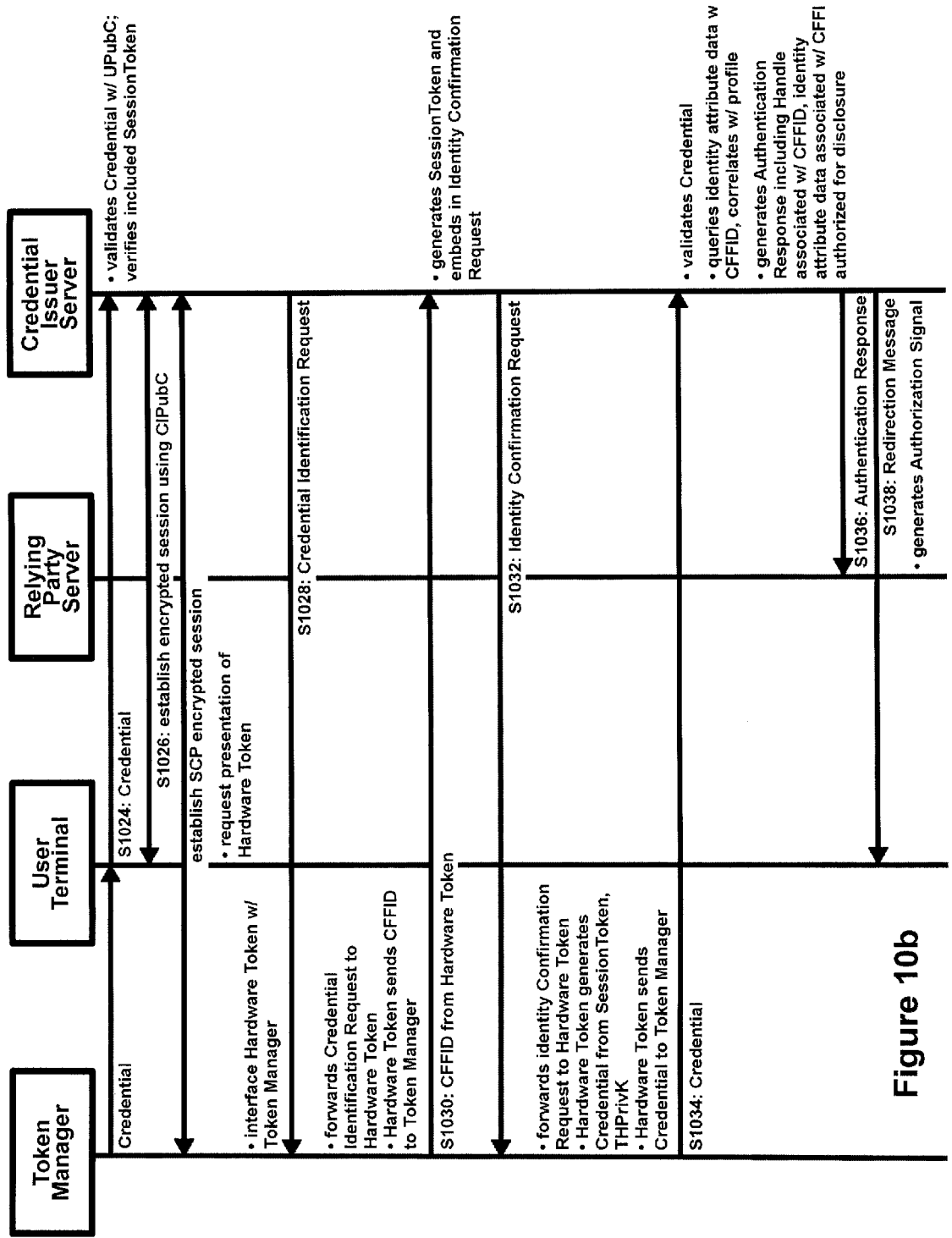

The Authentication process that is implemented by the Token Manager 100' will now be described with reference to FIGS. 10a and 10b. As discussed, the Enrolment process causes the Credential Issuer Server 140' to determine the validity of a credential (e.g. by verifying that the credential was generated by the Hardware Token 110 from an artefact that is transmitted to the Hardware Token 110 from the Credential Issuer Server 140'). Based on the outcome of the credential validity determination, the Enrolment process causes the Credential Issuer Server 140' to provide the Relying Party Server 180 with a unique identifier (handle) which anonymously identifies the terminal user.

During the Authentication process, the Credential Issuer Server 140' receives an identity attribute validation request (e.g. anonymous handle) from the Relying Party Server 180. The Credential Issuer Server 140 determines the validity of a credential (e.g. by verifying that the credential was generated by the Hardware Token 110 from an artefact that is transmitted to the Hardware Token 110 from the Credential Issuer Server 140'), and provides the Relying Party Server 180 with a response to the identity attribute validation request based on an outcome of the credential validity determination. The attribute validation response may include attributes data associated with the Hardware Token 110 authorized for disclosure to the Relying Party by the Relying Party's attribute disclosure profile, but excluding attributes data associated with the Hardware Token 110 not authorized for disclosure to the Relying Party by the Relying Party's attribute disclosure profile. The attribute validation response may indicate whether the credential was validated.

The Authentication process that is implemented by the Token Manager 100' is initiated, at step S1000 when the terminal user interfaces the Token Manager 100' with the User Terminal 120'. The User Terminal 120' starts a new session of the web browser 400, and logs in to the Relying Party Server 180 (typically over a server side SSL/TLS encrypted communication channel) at step S1002 by providing the terminal user's login credentials (e.g. a UserID and password).

The Relying Party Server 180 validates the terminal user's login credentials and, at step S1004, presents a list of Credential Issuers with which the Relying Party has previously registered. At step S1006, the terminal user uses the web browser 400 to select one of the listed Credential Issuers (preferably a Credential Issuer with whom the terminal user has already enrolled). The Relying Party Server 180 generates an encrypted authentication request message, and signs the encrypted authentication message with RPPrivK. At step S1008, the Relying Party Server 180 sends the encrypted authentication request message and RPPubC to the Credential Issuer Server 140' of the selected Credential Issuer (typically over a SSL/TLS encrypted communication channel).

The Credential Issuer Server 140' verifies that RPPubC was signed by the Root Certificate Authority and, if verified, validates the authentication request message using RPPubC, thereby verifying that the authentication request message was generated by the Relying Party. If the authentication request message is validated, the Credential Issuer Server 140' determines whether the Credential Issuer has an attribute disclosure profile associated with the RPPubC. If no attribute disclosure profile has been established associated with the RPPubC, the Authentication process aborts and the Relying Party must separately establish an attribute disclosure profile with the Credential Issuer.

However, if an attribute disclosure profile has been established for the Relying Party, the Credential Issuer Server 140' locates the attribute disclosure profile that is associated with the RPPubC to determine whether the associated Relying Party is entitled to disclosure of the identity attributes (if any) specified in the authentication request message. If the Relying Party is not entitled to disclosure of the specified identity attributes, the Authentication process aborts. Otherwise, at step S1010 the Credential Issuer Server 140' establishes an encrypted session with the Relying Party Server 180, using CIPubC, in the conventional manner. Preferably, the Relying Party Server 180 and the Credential Issuer Server 140' establish a mutually-authenticated encrypted TLS session using RPPubC and CIPubC.

The Credential Issuer Server 140' then generates a random Registration Ticket number and, at step S1012, transmits to the Relying Party Server 180 an acknowledgment message, that includes the assigned Registration Ticket number. At step S1014, the Relying Party Server 180 issues to the web browser 400 of the User Terminal 120' a redirection message that includes the Registration Ticket number, and redirects the browser 400 to the Credential Issuer Server 140'. The browser 400 connects to the Credential Issuer Server 140' (typically over a server side SSL/TLS encrypted communication channel) at step S1016, and provides the Credential Issuer Server 140' with the received Registration Ticket number and UPubC of the Token Manager 100'.

The Credential Issuer Server 140' then verifies that UPubC was signed by the Root Certificate Authority. If verified, at step S1018 the Credential Issuer Server 140' determines whether the terminal user has previously registered a Token Manager 100' with the Credential Issuer Server 140'. To do so, the Credential Issuer Server 140' queries the Registered User Database 520 with the terminal user's UPubC. If the terminal user has not registered a Token Manager 100' with the Credential Issuer Server 140', the Authentication process ends. However, if the terminal user has registered a Token Manager 100' with the Credential Issuer Server 140', the Credential Issuer Server 140' generates a session token, such as a random session number, and associates the session token with UPubC. The Credential Issuer Server 140' may sign the session token with the Credential Issuer Server's private key CIPrivK.

The Credential Issuer Server 140' may then generate an encrypted authentication message by encrypting the signed session token with UPubC. Preferably, the Credential Issuer Server 140' embeds the encrypted data and CIPubC in a browser cookie, and sends the cookie to the browser 400, at step S1020.

The Network Client 345 forwards the encrypted data and CIPubC to the Token Manager 100', at step S1022. Upon receipt, the Token Manager 100' decrypts the authentication message using UPrivK, and then verifies that CIPubC was signed by the Root Certificate Authority. If verified, the Token Manager 100' validates the signed session token using CIPubC. The Token Manager 100' or the Network Client 345 then generates a credential from UPubC.

The credential may be implemented as a digital certificate or as a pseudo-random code. To implement the credential as a digital certificate, the Token Manager 100 or the Network Client 345 may generate a Session private encryption key SPrivK and a Session public encryption key SPubK. SPrivK and SPubK comprise an asymmetric encryption key pair. The Token Manager 100' or the Network Client 345 may then generate a Session Certificate SCert that includes SPubK, the session token that was received from the Credential Issuer Server 140', the Token Manager Serial Number 321, and the distinguished name (DN) of UPubC. The Token Manager 100' or the Network Client 345 then signs SCert with UPrivK.

The Network Client 345 stores SCert in the Certificate Store 405, and stores the SPrivK in the Key Store 410. Since SCert is signed with UPrivK, SCert is uniquely associated with the Token Manager 100' in the sense that no other Token Manager 100' could have generated the credential.

To implement the credential as a pseudo-random code, the Token Manager 100' may use a suitable application, such as a One-Time-Password (OTP) application, to generate pseudo-random number. The Token Manager 100' or the Network Client 345 may sign the pseudo-random code, the Token Manager Serial Number 321, and the session token with UPrivK. Since the pseudo-random code, Serial Number 321 and session token is signed with UPrivK, the signed data is uniquely associated with the Token Manager 100' in the sense that no other Token Manager 100' could have generated the credential.

The Network Client 345 then uses the browser 400 to transmit the credential and UPubC to the Credential Issuer Server 140', at step S1024. The Credential Issuer Server 140' validates the credential using UPubC, thereby verifying that the credential was generated from UPubC and is uniquely associated with the Token Manager 100'. If the credential included a pseudo-random code, the Credential Issuer Server 140' may also validate the credential by comparing the pseudo-random code against an expected value for the pseudo-random code. Optionally, the Credential Issuer Server 140' also validates the credential by verifying that the Serial Number 321 that was included in the credential was associated with the Token Manager 100' (via UPubC) during the Registration process.

The Credential Issuer 140' also validates the credential by verifying that the session token included in the credential matches the session token transmitted by the Credential Issuer Server 140'. The Credential Issuer 140' may also verify that it had associated the received session token with UPubC and that the association is still valid.

If the credential is validated, at step S1026 the Credential Issuer Server 140' establishes an encrypted session with the web browser 400, using CIPubC, in the conventional manner. Preferably, the browser 400 and the Credential Issuer Server 140' establish a mutually-authenticated encrypted TLS session. If the credential comprises SCert, preferably the browser 400 and the Credential Issuer Server 140' establish the mutually authenticated TLS session using SCert and CIPubC. If the credential comprises the pseudo-random code instead of SCert, the Network Client 345 may provide the Credential Issuer Server 140' with a public certificate of the Token Manager 100', such as the User Certificate UPubC, to facilitate establishment of the mutually authenticated session. Further, preferably the Token Manager 100' and the Credential Issuer Server 140' establish a mutually-authenticated encrypted session, such as a GlobalPlatform Secure Channel Protocol (SCP) session, within the TLS session, to thereby encrypt communications between the Token Manager 100' and the Credential Issuer Server 140'.

If the browser 400, Token Manager 100' and the Credential Issuer Server 140' are unable to establish a mutually-authenticated encrypted session, an error is generated and the Authentication process aborts. However, if the encrypted sessions are successfully established, the Network Client 345 causes the browser 400 to display a message instructing the terminal user to physically interface with the User Terminal 120' the Hardware Token 110 that the terminal user presented during the Enrolment process.

After a Hardware Token 110 has been physically interfaced with the Token Manager 100', the Credential Issuer Server 140' generates a credential identification request message, and sends the credential identification request message to the Token Manager 100' via the SCP session, at step S1028.

The Token Manager 100' forwards the credential identification request message to the Hardware Token 110. Upon receipt, the Hardware Token 110 responds to the Token Manager 100' with the unique identifier (CFFID) of the Hardware Token 110. The Token Manager 100' then responds to the credential identification request message by transmitting the CFFID to the Credential Issuer 140' via the SCP session, at step S1030.

The Credential Issuer Server 140' uses the CFFID to determine whether the Credential Issuer had issued the Hardware Token 110. If the Credential Issuer did not issue a Hardware Token 110 having the received CFFID, the Authentication process aborts. Otherwise, the Credential Issuer Server 140' generates a session token, such as a random session number, embeds the session token in an identity confirmation request message, and sends the identity confirmation request message to the Token Manager 100' via the SCP session, at step S1032.

The Token Manager 100' forwards the identity confirmation request message to the Hardware Token 110. Upon receipt, the Hardware Token 110 generates a credential that includes card presence data. The card presence data may comprise a pseudo-random code, such as a One-Time Password (OTP), or a static secret, and may be generated by a Chip Authentication Program application on the Hardware Token 110.

The card presence data may also comprise dynamically-generated data. The dynamically-generated data may comprise a cryptogram, that is generated from data originating from the Credential Issuer 140'. The Hardware Token 110 may generate the cryptogram by signing the session token (received from the Credential Issuer 140) with THPrivK. Alternately, the Hardware Token 110 may generate the dynamically-generated data from the session token, an internal card counter number of the Hardware Token 110, and a diversified key (such as a triple-DES (Data Encryption Standard) key) of the Hardware Token 110.

When complete, the Hardware Token 110 sends the credential to the Token Manager 100'. The Token Manager 100 then responds to the identity confirmation request message by transmitting the credential to the Credential Issuer 140' via the SCP session, at step S1034. Since the credential is derived from the session token that was received from the Credential Issuer Server 140', the credential is uniquely associated with the Credential Issuer Server 140', in the sense that no other credential would have this session token. Further, since the credential includes card presence data, the credential is uniquely associated with the Hardware Token 110, and is also uniquely associated with the Hardware Token 110 and the Credential Issuer Server 140' in the sense that the credential is only associated with this combination of Hardware Token 110 and Credential Issuer Server 140'.

Upon receipt of the credential, the Credential Issuer Server 140' validates the credential by comparing the card presence data against an expected value for the card presence data. This latter step allows the Credential Issuer Server 140' to verify that the Hardware Token 110 was actually presented during the Authentication process and generated the credential from the session token. If the card presence data comprises a pseudo-random code or a static secret, the Credential Issuer Server 140' validates the credential by comparing the pseudo-random code or static secret against an expected value. The Credential Issuer Server 140' may also validate the credential by verifying that the credential is still in force.

If the credential comprises dynamically-generated card presence data, generated by signing the session token, the Credential Issuer Server 140' may validate the credential using the THPubC that the Credential Issuer 140' associates with the CFFID that was received at step S1030. If the card presence data was dynamically-generated from a diversified key, the Credential Issuer Server 140' typically already has a copy of the diversified key of the Hardware Token 110, and validates the credential by generating a reference value from the random number, the internal card counter number and the Credential Issuer's copy of the diversified key, and comparing the reference value against the received dynamically-generated data.

If the credential cannot be validated, an error is raised and the Authentication process aborts. Otherwise, the Credential Issuer Server 140' determines from the Relying Party's attribute disclosure profile the attributes authorized to be disclosed to the Relying Party. The Credential Issuer Server 140 then queries the attributes data with the CFFID and correlates the result with the list of authorized attributes for the attributes data associated with the CFFID and authorized for disclosure to the Relying Party.

The Credential Issuer Server 140' then generates an Authentication Response message that includes the attributes data associated with the CFFID authorized for disclosure to the Relying Party, but excludes attributes data associated with the CFFID not authorized for disclosure to the Relying Party. The attributes data may be expressed in absolute terms or relative to a requirement of the Relying Party. The attributes data may be expressed in both absolute and relative terms. For example, the attributes data might indicate compliance with a requirement of the Relying Party, and also provide data to substantiate that indication. In this embodiment, preferably the authorized attributes data include or are limited to the handle that the Credential Issuer Server 140' associated with the CFFID during the Enrolment process.

At step S1036, the Credential Issuer Server 140' responds to the Authentication Request message by transmitting the Authentication Response message to the Relying Party Server 180. At step S1038, the Credential Issuer Server 140' redirects the browser 400 back to the Relying Party Server 180.

The Relying Party Server 180 then generates an authorization signal based on the received Authentication Response message. If the attributes data includes the handle that the Credential Issuer Server 140' associated with the CFFID during the Enrolment process, the Relying Party Server 180 may generate the authorization signal by determining whether the handle included in the identifying data matches the handle that the Relying Party Server 180 associated with the terminal user's login credentials during the Enrolment process. In the event of a match, the authorization signal may comprise a message to a login procedure of the Relying Party Server 180 granting the User Terminal 120' access to the terminal user's account on the Relying Party Server 180. In the event of a match failure, the authorization signal might comprise a message to the User Terminal 120' indicating that the Credential Issuer Server 140' was unable to confirm the identity of the terminal user.

The invention claimed is:

1. A method of server-based identity attribute validation, comprising:
   a computer server receiving an identity attribute validation request from one of a plurality of communication devices, and an identifier associated with the one communication device, the identity attribute validation request requesting at least one attribute for disclosure to the one communication device, the computer server further receiving a credential and being configured with at least one attribute disclosure profile, each said attribute disclosure profile being associated with a respective one of the communication devices and identifying a disclosure authorization status for the associated communication device, for at least one attribute;
   the computer server determining a validity of the credential and the received identifier, and using the received identifier to locate the attribute disclosure profile associated with the one communication device; and
   the computer server providing the communication device with a response to the identity attribute validation request based on an outcome of the credential and identifier validity determination and a correlation between the at least one attribute of the identity attribute validation request and the at least one attribute of the located attribute disclosure profile, the attribute validation response including attribute data associated with the credential authorized for disclosure to the one communication device by the located attribute disclosure profile but excluding attribute data associated with the credential not authorized for disclosure to the one communication device by the located attribute disclosure profile,
   wherein the credential is associated with a hardware token, the computer server transmits a session token to the hardware token, and the credential validity determining step comprises the computer server verifying that the hardware token generated the credential from the session token, and
   wherein the hardware token is configured with a private encryption key, the computer server is configured with a public encryption key corresponding to the private encryption key, and the step of verifying the credential comprises the computer server validating the credential with the public encryption key.

2. The method according to claim 1, wherein the computer server receives the credential over a communication channel distinct from the identity attribute validation request.

3. The method according to claim 1, wherein the attribute validation response anonymously identifies an authorized recipient of the hardware token.

4. An issuer server comprising:
   at least one attribute disclosure profile, each said attribute disclosure profile being associated with one of a plurality of communication devices and identifying a disclosure authorization status for the associated communication device, for at least one attribute; and
   an identity attribute validation request processor configured to receive from one of the communication devices an identity attribute validation request and an identifier associated with the one communication device, wherein the identity attribute validation request processor is a hardware processor, the identity attribute validation request requesting at least one attribute for disclosure to the one communication device, and to further receive a credential, the identity attribute validation request processor being further configured to determine a validity of the received credential and the identifier, to use the received identifier to locate the attribute disclosure profile associated with the one communication device, and to provide the communication device with a response to the identity attribute validation request based on an outcome of the credential and identifier validity determination and a correlation between the at least one attribute of the identity attribute validation request and the at least one attribute of the located attribute disclosure profile, the attribute validation response including attribute data associated with the credential authorized for disclosure to the one communication device by the located attribute disclosure profile but excluding attribute data associated with the credential not authorized for disclosure to the one communication device by the located attribute disclosure profile,
   wherein the credential is associated with a hardware token, and the identity attribute validation request processor is configured to transmit a session token to the hardware token, and to determine the validity of the credential by verifying that the hardware token generated the credential from the session token, and
   wherein the hardware token is configured with a private encryption key, the issuer server is configured with a public encryption key corresponding to the private encryption key, and the identity attribute validation request processor is configured to verify the credential by validating the credential with the public encryption key.

5. The issuer server according to claim 4, wherein the computer server receives the credential over a communication channel distinct from the identity attribute validation request.

6. The issuer server according to claim 4, wherein the identity attribute validation request processor is configured to determine the validity of the credential by verifying that the credential is still in force.

7. A non-transitory computer-readable medium carrying at least one identity attribute associated with a credential, an attribute disclosure profile of the identity attributes authorized for disclosure to a communication device, and computer program instructions stored thereon, the computer program instructions when executed by a computer causing the computer to perform the method of claim 1.

8. A method of terminal-based identity attribute validation, comprising:
   receiving, by a communication terminal, a credential from a hardware token interfaced with the communication terminal, and transmitting to a computer server the credential, an identifier associated with the communication terminal, and an identity attribute validation request, the communication terminal being configured with an attribute disclosure profile identifying a disclosure authorization status for the communication terminal, for at least one attribute;

receiving, by the communication terminal, receiving a response to the identity attribute validation request from the computer server, the attribute validation response being based on an outcome of a determination of validity of the credential and the identifier by the computer server;

in accordance with the attribute validation response, using, by the communication terminal, the attribute disclosure profile to interrogate the hardware token for attribute data associated with the credential authorized for disclosure to the communication terminal but excluding attribute data associated with the credential not authorized for disclosure to the communication terminal; and generating, by the communication terminal, an authorization signal in accordance with a correlation between the authorized attribute data and a predetermined criterion.

9. The method according to claim 8, wherein the step of interrogating the hardware token for the authorized attribute data comprises querying the hardware token only for the attribute data authorized by the attribute disclosure profile.

10. The method according to claim 8, wherein the attribute validation response includes further attribute data authorized for disclosure to the communication terminal but excludes the attribute data not authorized for disclosure to the communication terminal.

11. A validation terminal comprising:

a credential interface configured to interface with a hardware token; an attribute disclosure profile identifying a disclosure authorization status for the validation terminal, for at least one attribute; and an identity attribute validation processor configured to (1) receive a credential from the hardware token, (2) transmit to a computer server the credential, an identifier associated with the validation terminal, and an identity attribute validation request, (3) receive a response to the identity attribute validation request from the computer server, the attribute validation response being based on an outcome of a determination of validity of the credential and the identifier by the computer server, (4) in accordance with the attribute validation response, use the attribute disclosure profile to interrogate the hardware token for attribute data associated with the credential authorized for disclosure to the communication terminal but excluding attribute data associated with the credential not authorized for disclosure to the communication terminal, and (5) generate an authorization signal in accordance with a correlation between the authorized attribute data and a predetermined criterion, the attribute validation response being based on an outcome of a determination of validity of the credential by the computer server.

12. The validation terminal according to claim 11, wherein the identity attribute validation processor is configured to interrogate the hardware token for the authorized attribute data by querying the hardware token only for the attribute data authorized by the attribute disclosure profile.

13. The validation terminal according to claim 11, wherein the attribute validation response includes further attribute data authorized for disclosure to the communication terminal but excludes the attribute data not authorized for disclosure to the validation terminal.

14. A non-transitory computer-readable medium carrying computer program instructions stored thereon, the computer program instructions when executed by a computer causing the computer to perform the method of claim 8.

* * * * *